(12) United States Patent
Walters

(10) Patent No.: US 10,460,253 B2
(45) Date of Patent: Oct. 29, 2019

(54) SYSTEM AND METHOD FOR SOLVING 3SAT USING A QUANTUM COMPUTER

(71) Applicant: Zachary B. Walters, Lake Quivira, KS (US)

(72) Inventor: Zachary B. Walters, Lake Quivira, KS (US)

(*) Notice: Subject to any disclaimer, the term of this patent is extended or adjusted under 35 U.S.C. 154(b) by 561 days.

(21) Appl. No.: 15/263,240

(22) Filed: Sep. 12, 2016

(65) Prior Publication Data

US 2017/0076220 A1    Mar. 16, 2017

Related U.S. Application Data

(60) Provisional application No. 62/249,438, filed on Nov. 2, 2015, provisional application No. 62/217,432, filed on Sep. 11, 2015.

(51) Int. Cl.
  *G06N 10/00*    (2019.01)
  *G06N 7/02*    (2006.01)
  *G06N 7/00*    (2006.01)

(52) U.S. Cl.
  CPC ............. *G06N 10/00* (2019.01); *G06N 7/005* (2013.01)

(58) Field of Classification Search
  CPC .... G06N 1/00; G06N 5/00; G06F 7/00; G06F 17/00
  See application file for complete search history.

(56) References Cited

U.S. PATENT DOCUMENTS

| | | | |
|---|---|---|---|
| 5,917,322 A * | 6/1999 | Gershenfeld | B82Y 10/00 324/307 |
| 7,590,607 B2 | 9/2009 | Williams et al. | |
| 8,832,164 B2 | 9/2014 | Allen et al. | |
| 2003/0169041 A1* | 9/2003 | Coury | G06N 10/00 324/307 |
| 2005/0167658 A1* | 8/2005 | Williams | G06N 10/00 257/31 |
| 2011/0047201 A1* | 2/2011 | Macready | B82Y 10/00 708/446 |
| 2014/0187427 A1* | 7/2014 | Macready | G06N 5/02 505/170 |

OTHER PUBLICATIONS

Hasegawa, "Design of Superconducting Single Flux Quantum Decimation Filters", IEEE, 2001 (Year: 2001).*
Orus, "Infinite time-evolving block decimation algorithm beyond unitary evolution", University of Queensland Australia (Year: 2008).*

(Continued)

*Primary Examiner* — Hal Schnee
*Assistant Examiner* — Van C Mang
(74) *Attorney, Agent, or Firm* — Law Office of Mark Brown, LLC; Mark E. Brown

(57) ABSTRACT

A method for solving the NP complete problem 3SAT and other computational problems which can be reduced to it. Quantum mechanical operations are performed on a finite number of quantum mechanical bits, or "qubits," in such a way as to concentrate probability in states which solve a given 3SAT problem, provided they exist. Concentration of probability is achieved by generalizing the traditional, reversible model of quantum computation to include irreversible operations mapping one density matrix to another.

4 Claims, 25 Drawing Sheets

(56) References Cited

OTHER PUBLICATIONS

"International Search Report and Written Opinion", PCT/US2016/051379, dated Jan. 6, 2017.
Deutsch, "Quantum Theory, thr Church-Turing Principle and the Universal Quantum Computer", Proceedings of the Royal Society of London, Series A, Mathematical and Physical Sciences, vol. 400, No. 1818 (Jul. 8, 1985), Jul. 8, 1985, 97-117.
Deutsch, et al., "Universality in quantum computation", Proceedings of the Royal Society A, (1995), 1995, 669-677.
Fortnow, "The Status of the P versus NP Problem", Communications of the ACM, vol. 52, No. 9, Sep. 2009.
Garey, et al., "Computers and Interactivity: A Guide to the Theory of NP-Completeness", Computers and Interactivity, Bell Telephone Laboratories, 1979, 1979, 1-175.
Grover, "Fixed-Point Quantum Search", Physical Review Letters, vol. 95, 150501 (2005), Oct. 3, 2005, 1-4.
Hao, et al., "A N/4 fixed-point duality quantum search algorithm", Science China, Physics, Mechanics & Astronomy, vol. 53, No. 9, Sep. 2010, 1765-1768.
Karp, "Reductability among Combinatorial Problems", University of California at Berkeley,, 1972.
Long, et al., "Duality Computing in Quantum Computers", Chinese Physical Society Community of Theoretical Physics, vol. 50, No. 6 (2008), Dec. 15, 2008, 1303-1306.
Merman, "Quantum Computer Science: An Introduction", Cambridge University Press, 2007, 2007, 1-237.
Mizel, et al., "Critically Damped Quantum Search", Physical Review Letters, vol. 102, 150501 (2009), Apr. 17, 2009, 1-4.
Nielson, et al., "Quantum Computation and Quantum Information", Cambridge University Press, 2010, 2010, 1-698.
Planck, "Treatise on Thermodynamics", Courier Corporation, 2013, 2013, 1-318.
Schlosshauer, "Decoherence: and the Quantum-to-Classical Transition", Springer Science & Business Media, 2007, 2007, 1-427.
Schoning, "A Probabilistic Algorith for k-Sat and Constraint Satisfaction Problems", FOCS '99 Proceedings of the 40th Annual Symposium on Foundations of Computer Science, 1999, Oct. 17, 1999, 410-414.
Tulsi, et al., "A New Algorithm for Fixed Point Quantum Search", Quantum Information and Computations, vol. 0, No. 0 (2005), 20015, 1-12.
Greenwood, "Finding solutions to NP problems: philosophical differences between quantum and evolutionary search algorithms", Evolutionary Computation, 2001, vol. 2, May 27, 2001, 815-822.
Walters, "A linear time quantum algorithm for 3SAT using irreversible quantum operations", https://arxiv.org/pdf/1510.00409v6.pdf, Sep. 28, 2015, 1-22.

* cited by examiner

SYSTEM AND METHOD FOR SOLVING 3SAT USING A QUANTUM COMPUTER

CROSS-REFERENCE TO RELATED APPLICATIONS

This application claims the benefit of U.S. Provisional Patent Application No. 62/249,438, filed Nov. 2, 2015, and also claims the benefit of U.S. Provisional Patent Application No. 62/217,432, filed Sep. 11, 2015, both of which are incorporated herein by reference.

BACKGROUND OF THE INVENTION

1. Field of the Invention

This invention relates generally to computing, and in particular to quantum computation.

2. Description of the Related Art

A quantum computer solves computational problems by performing physical transformations upon a finite quantum mechanical system in order to force the system to occupy a state with desired properties. Rather than operating on classical bits, which must take on values of 1 or 0 deterministically, a quantum computer operates on quantum mechanical "qubits," which can exist in arbitrary superpositions of two states. It is known that a quantum computer can solve some computational problems—not least of which, the simulation of other quantum systems—much faster than its classical counterpart. However, the class of problems for which significant speedup is possible is not yet known.

The 3 variable per clause boolean satisfiability problem, or 3SAT, consists of assigning a set of boolean variables $x_1$, $x_2$, $x_3$ ... to be true or false in such a way that a propositional logic formula in conjunctive normal form, or "CNF", $$(x \vee x_2 \vee \neg x_4) \wedge (x_2 \vee \neg x_3 \vee \neg x_5) \wedge \quad (1)$$

evaluates to true. Here, variables ($x_n$) or their negations ($\neg x_n$) within the same clause are linked with an OR ($\vee \neg$) operator, while different clauses are linked by an AND ($\wedge$) operator. An assignment must satisfy all clauses in order to solve the problem.

3SAT is well known in computer science for being NP complete [8, 4]. This means that it has the property that any problem whose solutions can be checked in polynomial time (class "NP") can be reduced in polynomial time to a 3SAT problem. Thus, a polynomial time solution for 3SAT could be used to solve any problem in NP in polynomial time as well. It is believed but not proven that no algorithm on a classical computer can solve an NP complete problem in polynomial time; the question of whether this is true is one of the most famous problems in mathematics [3].

Here reduction consists of a mapping from an instance of one problem to an instance of another, in such a way that a solution to the second instance can be mapped to a solution of the first. A computational problem consists of a list of problem parameters, plus a statement of what properties a solution to the problem must satisfy [4]. An instance of a problem is obtained by specifying particular values for all problem parameters.

A solution algorithm for a computational problem determines whether a particular instance has a solution or proves that none exists, but does not necessarily produce a solution. A constructive solution algorithm produces at least one valid solution, provided that some solution exists. A probabilistic solution algorithm determines whether a solution exists or not with probability of error no greater than some value $\in$ between 0 and ½, which by convention is usually chosen to be ⅓. A probabilistic algorithm can be run many times to increase the certainty that a given instance either has or does not have a solution.

SUMMARY OF THE INVENTION

This invention comprises a new type of quantum computer which causes irreversible physical changes to occur in a quantum mechanical system, a set of physical transformations, or "gates" which change the state of the system in a logically meaningful way, and an algorithm which transfers quantum probability from physical states which fail to solve some 3SAT problem of interest to a state or set of states which does. Provided that at least one solution state exists, the algorithm causes the total nonsolution probability to decay exponentially, so that the probability of occupying a solution state becomes arbitrarily close to 1.

The new type of quantum computer, the quantum gates which it makes use of, and the algorithm for concentrating probability in solution states, all depart from a traditional tenet of quantum computation, which holds that any operation performed by the computer must be reversible in the sense of having a well defined inverse operation which recovers the original wavefunction. For clarity, the new type of computer will be referred to as an "irreversible" quantum computer. Rather than mapping one wavefunction to another as in a traditional quantum computer, an irreversible quantum computer maps one density matrix to another. As indicated by the name, this mapping may have no well defined inverse.

The general approach for achieving this goal is to incoherently transfer population from an arbitrary initial state to a state or set of states which satisfy some 3SAT problem of interest. This is accomplished by constructing decimation gates—essentially, error correction loops—which transfer population from states which fail individual logical clauses to states which satisfy those clauses. In pseudocode, the algorithm can be described as

```
for each clause in the problem do
    Encode the satisfaction of the clause in a temporary scratch bit
    if the clause is not satisfied then
        Use the scratch bit to perform a controlled rotation of the
        variables in the clause
    end if
    Clean up temporary scratch bits by measurement.
end for
```

Here the controlled rotation causes population loss for states which fail a particular clause. States which fail many clauses lose population more quickly than states which fail only a few, and solution states, which satisfy all clauses, act as population sinks.

Because a quantum computer operates by physically transforming a finite quantum mechanical system, all methods described here have a second use as a means of quantum mechanical state preparation. This has value in the physical sciences, where it is often necessary to prepare a wavefunction in a specified initial state in order to observe desired physical effects.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

I. Introduction and Environment

Figure 1:
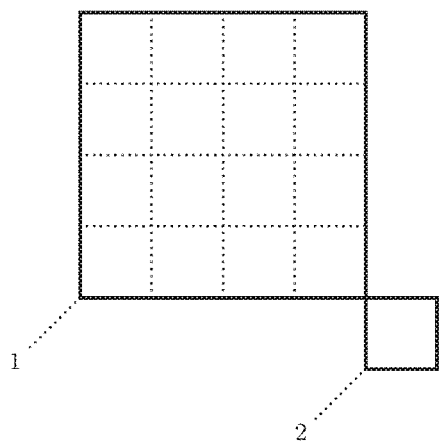
FIG. 1 An insertion operation couples the system of interest 1 to a new bit 2 prepared in a desired state and unentangled with the bits already in the system.

As required, detailed aspects of the present, invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

II. Irreversible quantum computation

In 1985, Deutsch [1, 2] showed that a small set of one- and two bit operators, or "gates," are universal in the sense that any unitary operation on N qubits can be approximated to arbitrary precision by a quantum circuit consisting only of these gates.

A unitary operator U has the property that its inverse is equal to its Hermitian conjugate $$U^\dagger U = UU^\dagger = I, \quad (2)$$

where $U^\dagger$ is the Hermitian conjugate and I the identity. A unitary operator may act upon a wavefunction to yield another wavefunction $$\psi' = U\psi \quad (3)$$

or upon a density matrix to yield another density matrix $$\rho' = U\rho U^\dagger \quad (4)$$

As indicated by the name "universal," a central principle of traditional quantum computation is that any computation consists of a unitary operation applied to a wavefunction, which may be prepared in a desired initial state. See, for instance, [11] p171 (" . . . there exists a small set of gates which are universal, that is, any quantum computation whatsoever can be expressed in terms of those gates.") or [9] p36 ("Since quantum computers must operate reversibly to perform their magic (except for measurement gates), they are generally designed to operate with both input and output registers . . . The computational process will generally require many Qbits besides the n+m in the input and output registers, but we shall ignore these additional Qbits for now, viewing a computation of f as doing nothing more than applying a unitary transformation, $U_f$, to the n+m Qbits of the input and output registers.")

The algorithm described below is run on a new type of quantum computer—an "irreversible" quantum computer. As indicated by its name, an irreversible computer performs operations mapping an initial density matrix to a final density matrix which cannot 10 in principle be inverted to recover the initial state of the system. This contrasts with the unitary operations U performed by a traditional, "reversible" quantum computer, which have well defined inverses $U^\dagger$. The distinction between reversibility and irreversibility is a fundamental physical distinction which has been recognized for more than a century in the context of thermodynamics [12].

Although the basic equations of physics are reversible, irreversible operations may be performed upon a system of interest by allowing it to interact with another system, which plays the role of the environment [13]. As the two systems interact, the state of the system becomes entangled with that of the environment, so that the states of the two systems cannot be described independently. The reduced density matrix describing the system alone can be obtained from that describing the system and environment together by tracing over all environmental degrees of freedom.

$$\rho'_s = Tr_e U_{se} \rho_{se} U_{se}^\dagger, \quad (5)$$

where subscript "e" denotes states of the environment, "s" states of the system, and "se" states of the system coupled to the environment. In general, tracing over the environmental degrees of freedom in this way will yield a reduced density matrix which is related to the density matrix of the system before interaction with the environment by an irreversible transformation—it is not possible to recover the initial density matrix uniquely given the final reduced density matrix.

In contrast, a traditional quantum computer performs an arbitrary unitary operation U on a system of interest in such a way that there is a reversible transformation which recovers the initial state. The state of the system after an arbitrary unitary operation is given by $$\rho'_s = U_s \rho_s U_s^\dagger. \quad (6)$$

If the system of interest interacts with another system, such as the surrounding environment, the computation is performed in such a way that the state of the additional system remains unentangled with the state of the system of interest [11, 9], so that the density matrix can be separated into the product of a system density matrix and an environment density matrix both before $$\rho_{se} = \rho_s \otimes \rho_e, \quad (7)$$

and after the computation $$\rho'_{se} = U_s \rho_s U_s^\dagger \otimes \rho_e. \quad (8)$$

Because the density matrix for the system and the environment can be written in this way, tracing over the states of the environment yields $$\rho'_s = U_s \rho_s U_s^\dagger \otimes Tr_e \rho_e = U_s \rho_s U_s^\dagger. \quad (9)$$

Here the final reduced density matrix is related to the initial density matrix by a unitary transformation, and there is a well defined inverse operation to recover the initial system $$\rho_s = U_s^\dagger \rho'_s U_s. \quad (10)$$

It can be seen that a reversible quantum operation is a special case of an irreversible quantum operation, in which the final state of the system plus environment can be separated into the state of the system and the state of the environment.

Figure 2:
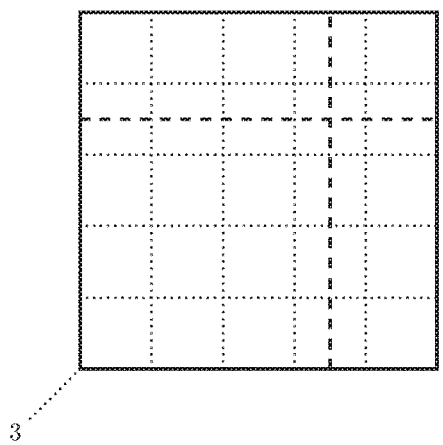
FIG. 2 A deletion operator measures the state of a chosen bit, projecting the N×N density matrix 3 onto an (N−1)×(N−1) submatrix. Here dashed lines indicate measurement along some axis.

To achieve irreversibility, two new operations are required. An insertion operation I, shown in FIG. 1, introduces a new qubit previously unentangled with the bits in the system of interest, in an initial state chosen by the user. This projects an N×N density matrix onto an (N+1)×(N+1) density matrix. A deletion operation D, shown in FIG. 2, measures the state of a qubit in the system. This projects the measured qubit onto an eigenstate of the measurement operator and projects an N×N density matrix onto an (N−1)×(N−1) submatrix. If desired, a deleted bit can be immediately reinserted into the problem, keeping the size of the density matrix constant.

A second method of deletion consists of partitioning the full system into the deleted bit d and the remaining system s, and leaving the deleted bit untouched after deletion without measuring its state. Performing any measurement on the system s will then trace over the states of the deleted bit. This method of deletion yields no information about the state of the system, but leaves the deleted bits entangled with those of the system, making them ineligible to be reinserted at a later stage in the algorithm.

Both insertion and deletion operators formally extend the capabilities of a quantum computer by allowing for operations which change the number of bits in the system of is interest. However, the distinction between reversible and irreversible quantum computation is not formal but physical. As indicated by Eqs. 9 and 5, an irreversible computation requires information not contained in the system of interest in order to recover the initial density matrix, while a reversible computation can be inverted using only information contained in the system.

Thus, quantum error correction, which introduces redundant bits beyond those required to describe the system and performs intermediate measurements with the goal of keeping the state of the system unentangled with the state of the surrounding environment, is an example of reversible computation despite the use of insertion and deletion operations. Conversely, performing a unitary operation which entangles n system and m environment bits represents an irreversible computation if the density matrix for system plus environment cannot be separated into the product of a density matrix describing the system and one describing the environment. Use of natural decoherence processes to achieve an irreversible change to the system density matrix is a particular example of the second case, where the unitary operation entangling system and environment arises due to natural processes rather than operations induced by the user.

III. Rotation and Measurement Gates

A quantum gate is a series of quantum operations applied to some subset of bits in the system of interest in order to achieve some desired physical change. Irreversible gates have the additional property that it is not possible to recover the original state of the system; for example, multiple initial states may be mapped to the same final state. This is a particularly desirable property in the context of 3SAT, where the number of potential states may be exponentially larger than the subset of states which have desirable properties such as solving the problem of interest.

A common way to represent an individual quantum bit is to map a two state system to the surface of a Bloch sphere. Projections of the quantum bit onto some chosen axis, or rotations about that axis, can be made using Pauli spin operators $$\sigma_x = \begin{pmatrix} 0 & 1 \\ 1 & 0 \end{pmatrix}, \quad (11)$$

$$\sigma_y = \begin{pmatrix} 0 & i \\ -i & 0 \end{pmatrix}, \quad (12)$$

and $$\sigma_x = \begin{pmatrix} 1 & 0 \\ 0 & -1 \end{pmatrix}. \quad (13)$$

Although in general a quantum bit may be mapped to any vector on the Bloch sphere, the preferred implementation of this algorithm utilizes bits which are confined to the xz plane at all times, so that a single bit is rotated only about the y axis. As the information encoded by the other polar angle is not needed for this algorithm, it is free to be used for other purposes such as quantum error correction. A quantum bit is chosen to be True if it has positive projection on the $\hat{z}$ axis, and False if it has negative projection.

a. One- and Two Bit Rotation Gates

Figure 3:
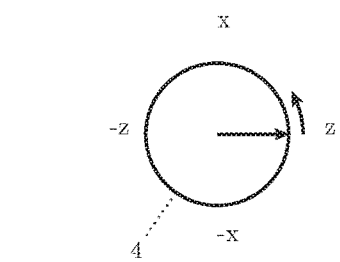
FIG. 3 A single bit rotation operator rotates a single bit 4 about the $\hat{y}$ axis. Here the straight arrow indicates the state of the bit in question within the xz plane of the Bloch sphere, while the curved arrow indicates the direction of rotation. True is chosen to coincide with state $|+z\rangle$, while False is chosen to be $|-z\rangle$. The orientation of the z and x axes in this figure is used in other figures as well.

Bit n is rotated in the xz plane by the single bit operator $$R^n(\theta) = \exp[i\sigma_y^n \theta/2] \qquad (14)$$
$$= \begin{pmatrix} \cos(\theta/2) & -\sin(\theta/2) \\ \sin(\theta/2) & \cos(\theta/2) \end{pmatrix},$$

shown pictorially in FIG. 3.

Figure 4:
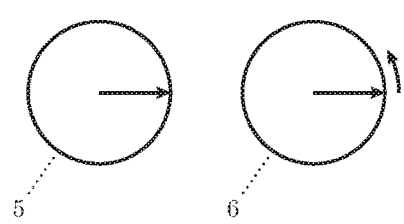
FIG. 4 A two bit rotation operator uses the projection of bit 5 onto a desired axis to control the rotation of bit 6 about the y axis. Here a positive projection of state 5 onto the $\hat{z}$ axis causes bit 6 to rotate counterclockwise about the $\hat{y}$ axis.
Figure 5:
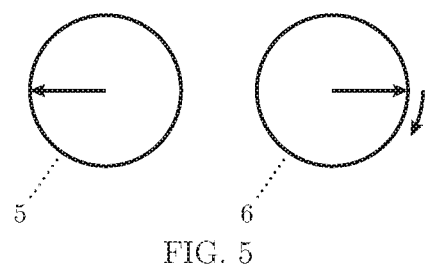
FIG. 5 A two bit rotation operator uses the projection of bit 5 onto a desired axis to control the rotation of bit 6 about the y axis. Here a negative projection of state 5 onto the $\hat{z}$ axis causes bit 6 to rotate clockwise about the $\hat{y}$ axis.

The projection of bit n onto axis i can be used to rotate bit m by means of two bit operator $$R_i^{n \to m}(\theta) = \exp[\pm i\sigma_i^n \sigma_y^m \theta/2] \qquad (15)$$
$$= R^t(\pm\theta/2)\exp[i \pm \sigma_z^c \sigma_y^t \theta/4]$$
$$= \begin{pmatrix} \cos(\theta/2) & -\sin(\pm\theta/2) & 0 & 0 \\ \sin(\pm\theta/2) & \cos(\theta/2) & 0 & 0 \\ 0 & 0 & \cos(\theta/2) & \sin(\pm\theta/2) \\ 0 & 0 & -\sin(\pm\theta/2) & \cos(\theta/2) \end{pmatrix},$$

where the choice of sign depends on whether the value of $X_n$ or $\neg X_n$ is used to control the rotation. A positive projection on axis i causes counterclockwise rotation, shown in FIG. 4, while a negative projection causes clockwise rotation, shown in FIG. 5.

Unless stated otherwise, the operators and gates defined in this document will be defined so that the state of a variable rather than its negation acts as the control parameter. If it is more convenient to use a variable's negation as the control parameter, this can be achieved by a change of signs inside the exponential.

For simplicity in notation, it is useful to define a controlled rotation operator $$CR_i^{n \to m}(\theta) = R^m(\theta/2)R_i^{n \to m}(\theta/2) \qquad (16)$$
$$= \begin{pmatrix} \cos(\theta/2) & -\sin(\theta/2) & 0 & 0 \\ \sin(\theta/2) & \cos(\theta/2) & 0 & 0 \\ 0 & 0 & 1 & 0 \\ 0 & 0 & 0 & 1 \end{pmatrix},$$

where bit m is rotated by angle $\theta$ if bit n has positive projection on axis i and remains unchanged if bit n has negative projection on this axis.

As the $\sigma_z^c \sigma_y^t$ operator of Eq. 16 may be difficult to realize physically, a controlled rotation may be more straightforward to implement using out of plane rotations. Defining a rotation about the x axis as $$R_x(\theta) = e^{i\sigma_x \theta/2}, \qquad (17)$$

Eq. 16 can also be written as $$CR^{c \to t}(\theta) = R^t(\theta/2)R_x^t(-\pi/2)e^{i\sigma_z^t \theta/4}R_x^t(\pi/2). \qquad (18)$$

A second variation of the conditional rotation is to perform the rotation when the control bit is false and leave the target bit unrotated when the control bit is true. Defining $$X = \begin{pmatrix} 0 & 1 \\ 1 & 0 \end{pmatrix}, \qquad (19)$$

it can be seen that $$X^c CR^{c \to t} X^c = \begin{pmatrix} 1 & 0 & 0 & 0 \\ 0 & 1 & 0 & 0 \\ 0 & 0 & \cos(\theta/2) & -\sin(\theta/2) \\ 0 & 0 & \sin(\theta/2) & \cos(\theta/2) \end{pmatrix}. \qquad (20)$$

b. Measurement Gates

Figure 6:
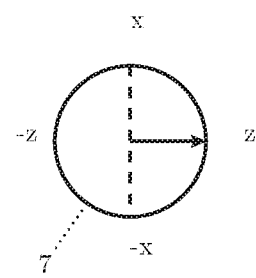
FIG. 6 A measurement operator measures the projection of a state 3 onto a desired axis and projects it onto the eigenstate corresponding to the measured value. Here the dashed line indicates the axis of measurement.

The projection of bit n onto axis i is measured by projecting onto eigenstates $|\gamma\rangle$ of spin matrix $$\sigma_i(\theta, \phi) = \cos(\theta)\sigma_z + \sin(\theta)\cos(\phi)\sigma_x + \sin(\theta)\sin(\phi)\sigma_y. \qquad (21)$$

using projection operator $$P_i^n = \sum_i \gamma_i |\gamma_i\rangle\langle\gamma_i|, \qquad (22)$$

where $\gamma_i$ is the eigenvalue associated with eigenstate $|\gamma_i\rangle$. This operator is shown pictorially in FIG. 6.

Following the rules of quantum mechanics, measuring the projection of bit n onto axis i forces that bit to occupy an eigenstate of the measurement operator—here, an eigenstate with a positive ($|\gamma_i\rangle = |½\rangle$) or negative ($|\gamma_i\rangle = |-½\rangle$) projection along the axis being measured. If the state of the bit being measured is entangled with the states of other bits, this measurement may give partial information about the states of the bits in question. Conversely, in some cases the axis of measurement can be chosen so as to give no information about the states of other bits. Here, "partial measurement" means that some information about the state of one or more bits is gathered, but not enough information to uniquely determine their quantum state.

IV. Irreversible Gates

The general design of the irreversible gates defined below is to introduce a temporary scratch bit initialized to be true ($|+z\rangle$), then perform quantum operations such that the bit has a positive projection on some axis if a logical expression evaluates to true, and a negative projection onto the same axis if the expression evaluates to false. This axis is named the "axis of truth." The state of the scratch bit can then be used as an input to a new gate, or to control rotations of other variables in the problem. When no longer needed, the information contained in a scratch bit is destroyed by measurement orthogonal to the axis of truth.

Here the choice of which axis is to be used as the "axis of truth" is completely arbitrary. However, the choice to measure the scratch bits along an axis orthogonal to this is physically meaningful. Measuring the bit's projection onto an axis oriented at angle $\theta$ relative to the axis of truth yields partial information about whether the logical expression has been satisfied, varying from no information at all when $\theta = \pi/2$ to complete information when $\theta = 0$. Thus, all irreversible gates defined in this section have generalizations where the state of the scratch bit is measured along an axis oriented with angle $\theta \neq \pi/2$ relative to the axis of truth.

Another physically meaningful deviation from this model is to project the scratch bit onto state $|\alpha\rangle$ if the expression evaluates to true, and state $|\beta\rangle$ if the expression evaluates to false, where $|\alpha\rangle$ and $|\beta\rangle$ are not orthogonal. In this case, it is not possible to define an axis of truth. However, the state of the scratch bit can still be used as an input to a new gate or to act upon other variables in the problem in such a way as to yield an irreversible operation on the density matrix.

a. QCOPY Gate

A quantum copy gate introduces a new bit s, in initial state $|+z\rangle$, and rotates it such that it duplicates the state of existing bit c $$QCOPY^{c \to s} = CR_{-z}^{c \to s}(\pi) \quad (23)$$

b. QNOT Gate

A quantun NOT gate introduces a new bit s, in initial state $|+z\rangle$, and rotates it to be diametrically opposite to an existing bit c $$QNOT^{c \to s} = CR_z^{c \to s}(\pi) \quad (24)$$

c. Self Controlled Rotation

The use of temporary scratch bits allows for the state of a bit to control is own rotation, or for the use of conditional rotations. The rotation of bit n according to its own projection onto axis i can be accomplished by introducing a scratch bit s, initialized to be true, and applying two two bit rotations and a measurement to yield a self controlled rotation $$SCR_z^n(\theta) = P_z^s R_x^{s \to n}(\theta) R_z^{n \to s}(\pi/2) \quad (25)$$

Figure 7:
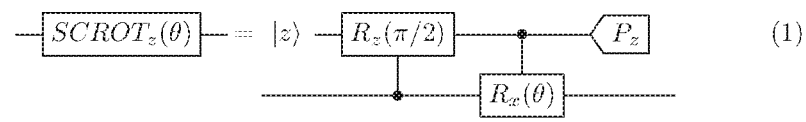
FIG. 7 Quantum circuit diagram for self controlled rotation gate SCROT.
Figure 8:
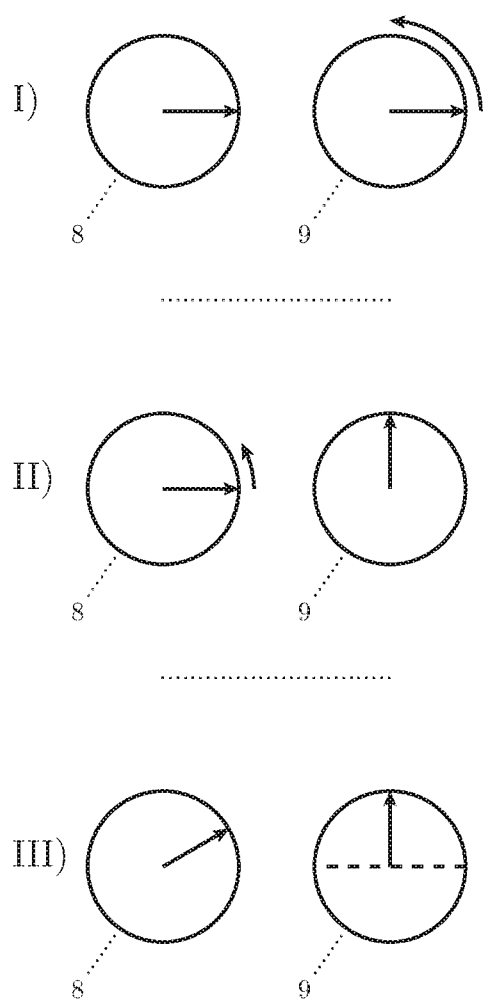
FIG. 8 Self controlled rotation gate SCROT uses a bit's projection onto a desired axis to control its own rotation about the $\hat{y}$ axis. In I, a positive projection of control bit onto the $\hat{z}$ axis causes counterclockwise rotation of scratch bit 8 by angle $\pi/2$. In II, positive projection of scratch bit onto $\hat{x}$ axis causes control bit to rotate counterclockwise. In III, the state of the scratch bit is measured along an axis orthogonal to $\hat{x}$, yielding an irreversible operation on the control bit. Because the measurement is along an axis orthogonal to the "axis of truth", $\hat{x}$, this information yields no information about the state of the control bit.
Figure 9:
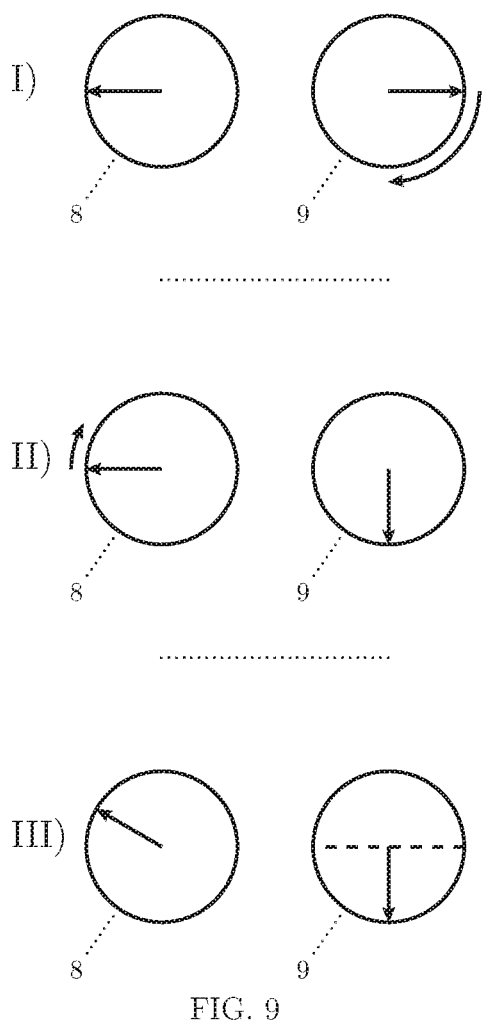
FIG. 9 Self controlled rotation gate SCROT uses a bit's projection onto a desired axis to control its own rotation about the $\hat{y}$ axis. In I, a negative projection of control bit onto the $\hat{z}$ axis causes clockwise rotation of scratch bit 8 by angle $\pi/2$. In II, negative projection of scratch bit onto $\hat{x}$ axis causes control bit to rotate clockwise. In III, the state of the scratch bit is measured along an axis orthogonal to $\hat{x}$, yielding an irreversible operation on the control bit. Because the measurement is along an axis orthogonal to the "axis of truth", $\hat{x}$, this information yields no information about the state of the control bit.
Figure 10:
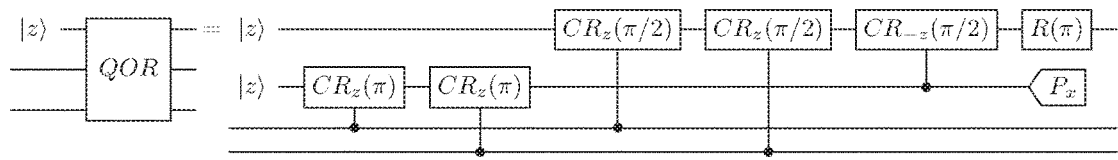
FIG. 10 Quantum circuit diagram for QOR gate.
Figure 11:
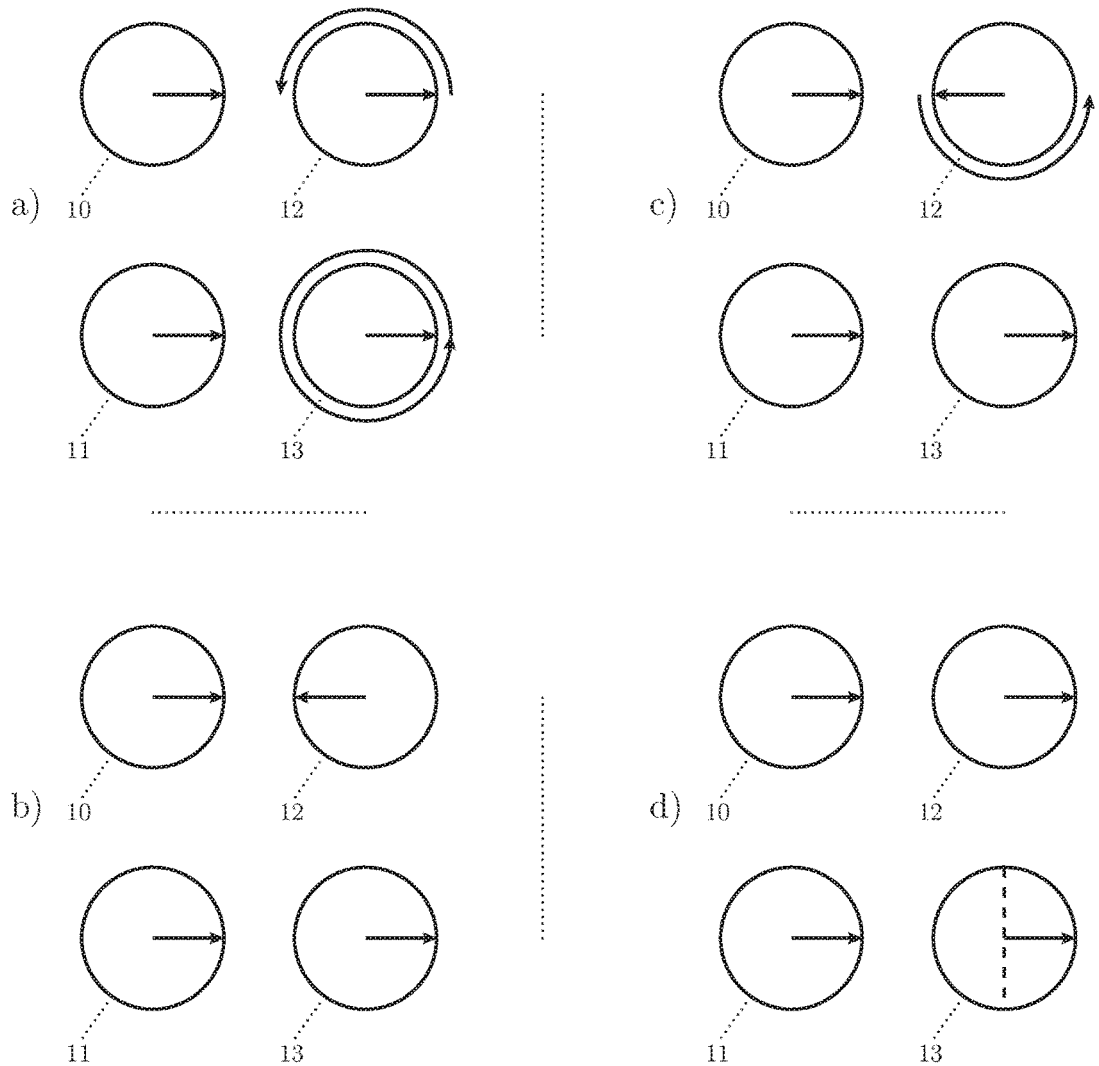
FIG. 11 The QOR gate uses the state of control bits 9 and 10 to control the state of scratch bit 11, such that the final state of bit 11 is true if 9 or 10 is true, and false otherwise. Scratch bit 12 is a temporary scratch bit, used to determine whether an even or odd number of control bits are true. In I, the states of 9 and 10 control the rotation of bits 11 and 12. In II, the projection of 12 on the $-z$ axis controls the rotation of bit 11. In III, the state of bit 11 is rotated by $\pi$. In IV, the state of bit 12 is measured along the $\hat{x}$ axis, yielding no information about whether an odd or even number of control bits are true.
Figure 12:
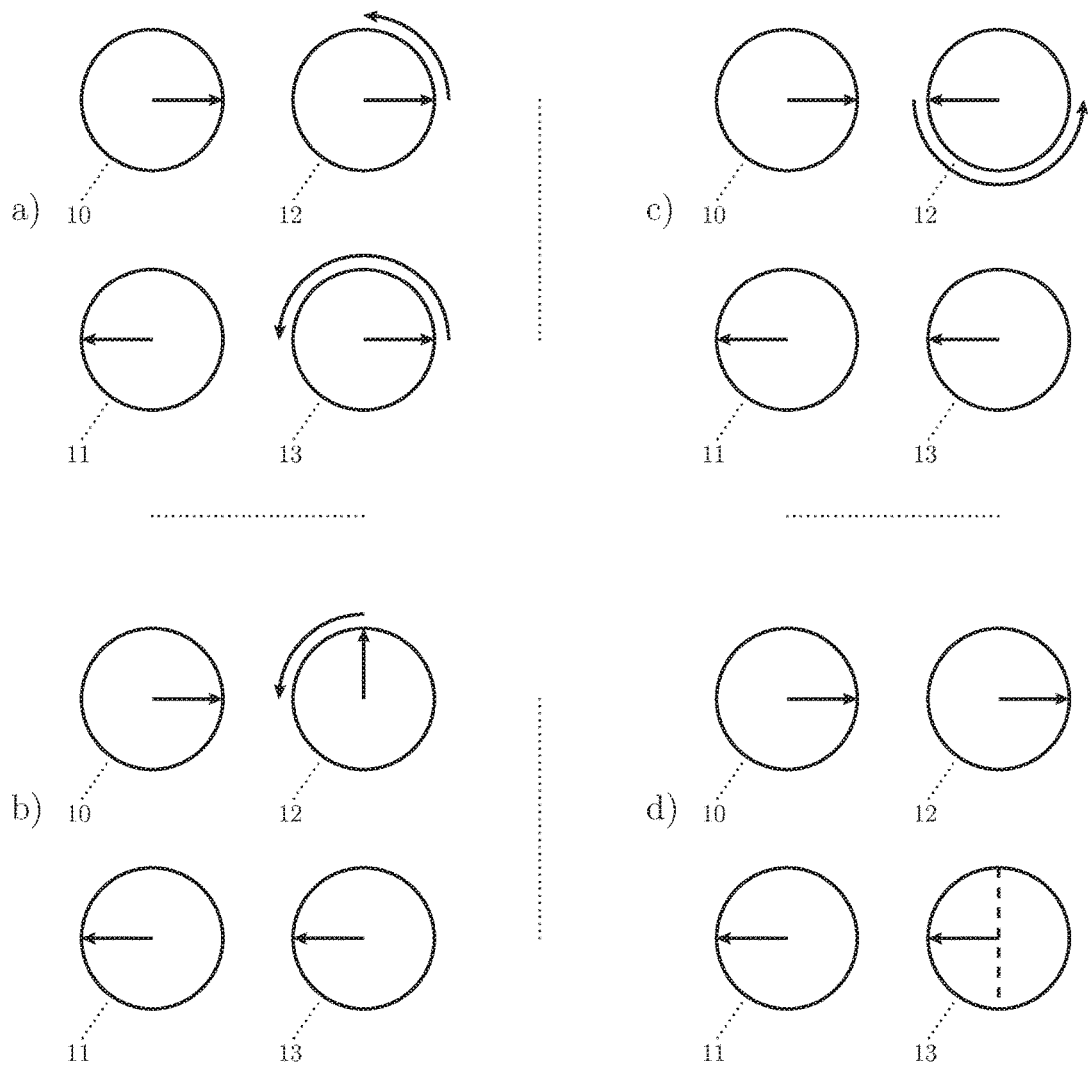
FIG. 12 The QOR gate uses the state of control bits 9 and 10 to control the state of scratch bit 11, such that the final state of bit 11 is true if 9 or 10 is true, and false otherwise. Scratch bit 12 is a temporary scratch bit, used to determine whether an even or odd number of control bits are true. In I, the states of 9 and 10 control the rotation of bits 11 and 12. In II, the projection of 12 on the $-z$ axis controls the rotation of bit 11. In III, the state of bit 11 is rotated by $\pi$. In IV, the state of bit 12 is measured along the $\hat{x}$ axis, yielding no information about whether an odd or even number of control bits are true.
Figure 13:
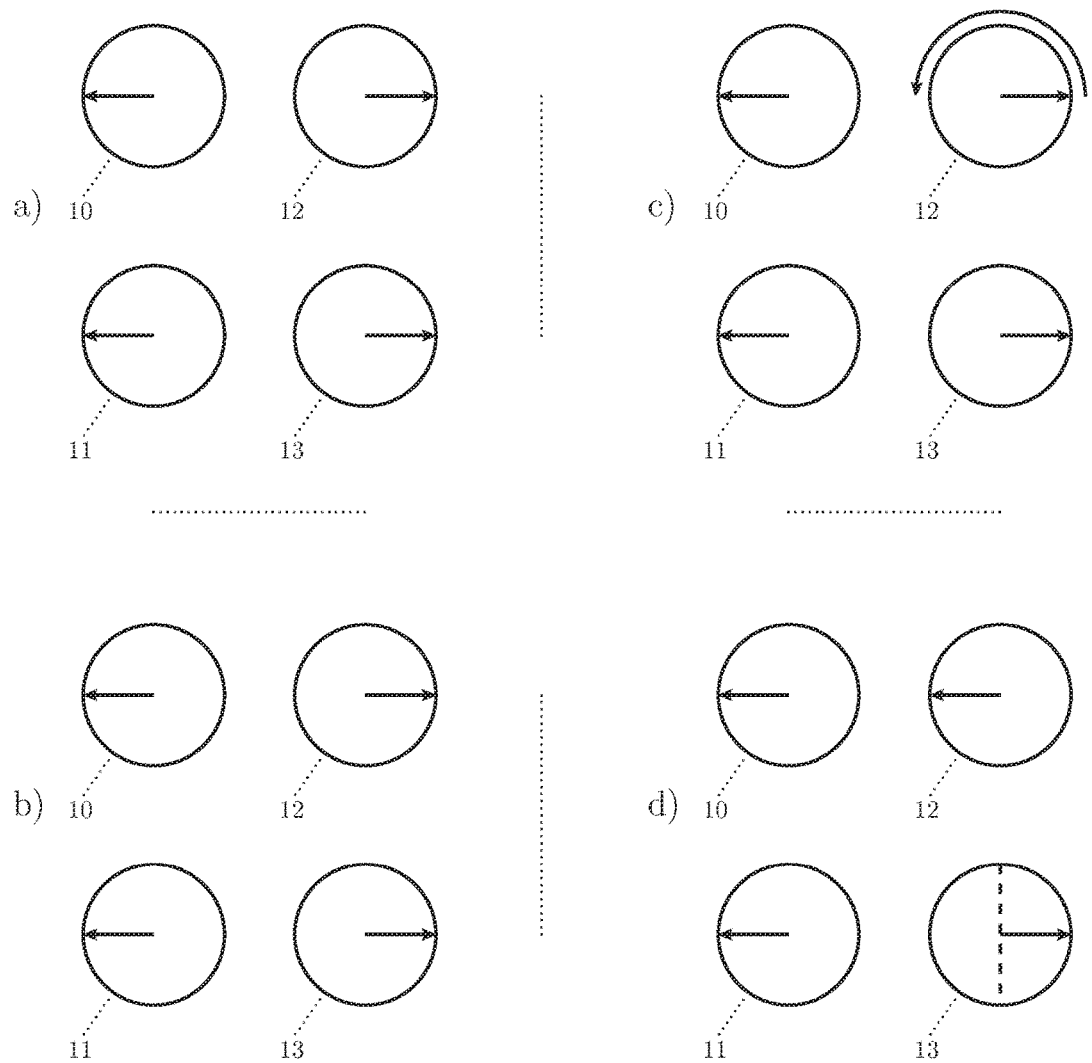
FIG. 13 The QOR gate uses the state of control bits 9 and 10 to control the state of scratch bit 11, such that the final state of bit 11 is true if 9 or 10 is true, and false otherwise. Scratch bit 12 is a temporary scratch bit, used to determine whether an even or odd number of control bits are true. In I, the states of 9 and 10 control the rotation of bits 11 and 12. In II, the projection of 12 on the $-z$ axis controls the rotation of bit 11. In III, the state of bit 11 is rotated by $\pi$. In IV, the state of bit 12 is measured along the $\hat{x}$ axis, yielding no information about whether an odd or even number of control bits are true.
Figure 14:
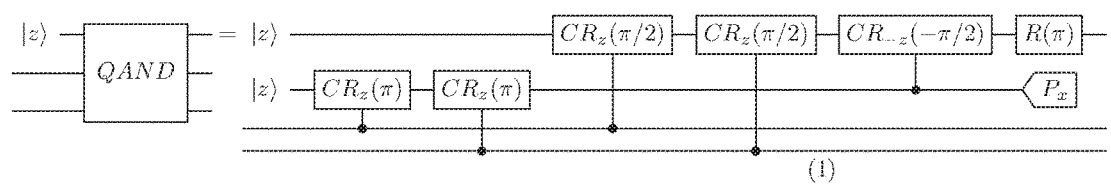
FIG. 14 Quantum circuit diagram for QAND gate.
Figure 15:
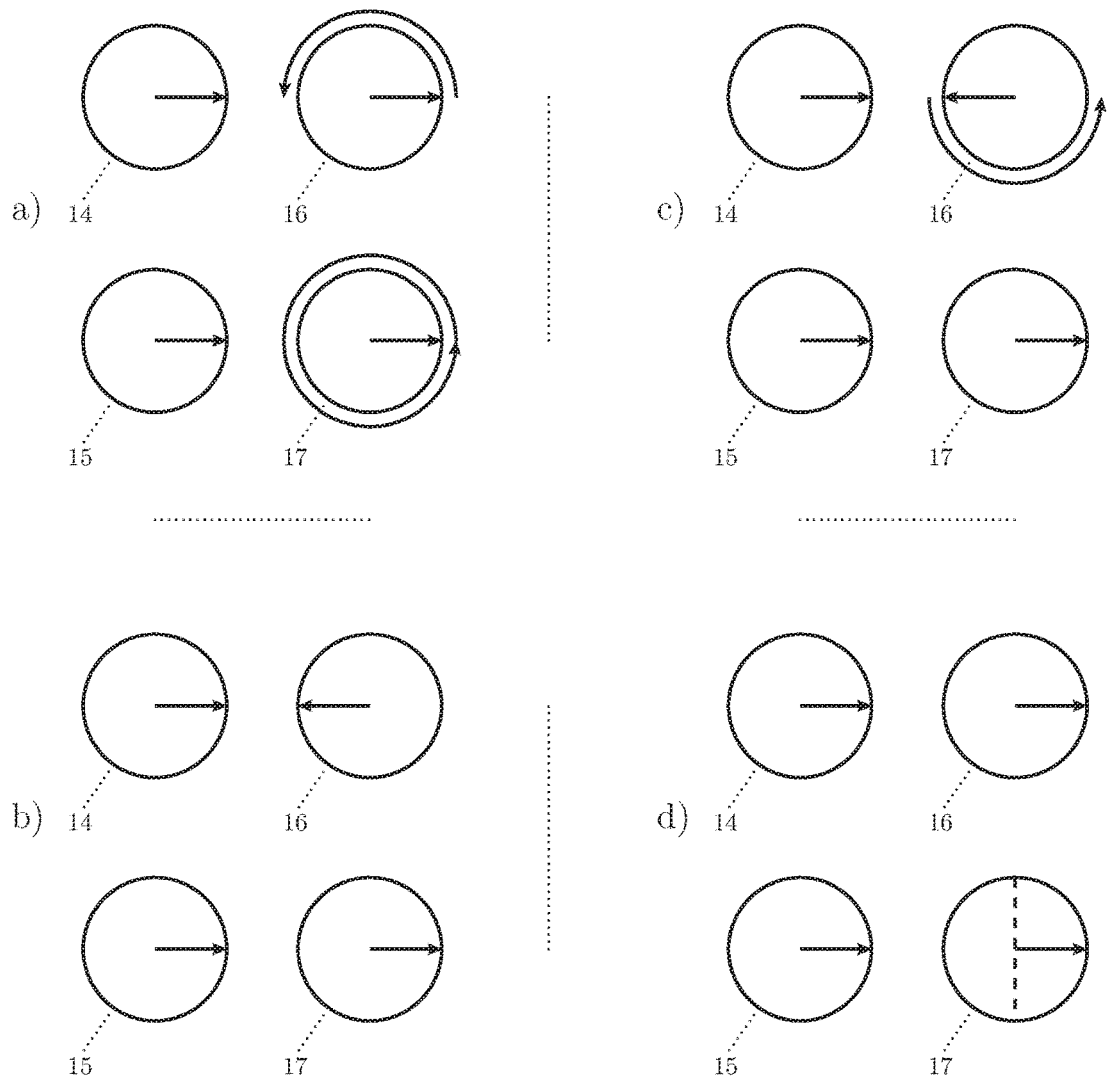
FIG. 15 The QAND gate uses the state of control bits 13 and 14 to control the state of scratch bit 15, such that the final state of bit 15 is true if 13 and 14 is true, and false otherwise. Scratch bit 16 is a temporary scratch bit, used to determine whether an even or odd number of control bits are true. In I, the states of 13 and 14 control the rotation of bits 15 and 16. In II, the projection of 16 on the $-z$ axis controls the rotation of bit 15. In III, the state of bit 15 is rotated by $\pi$. In IV, the state of bit 16 is measured along the $\hat{x}$ axis, yielding no information about whether an odd or even number of control bits are true.
Figure 16:
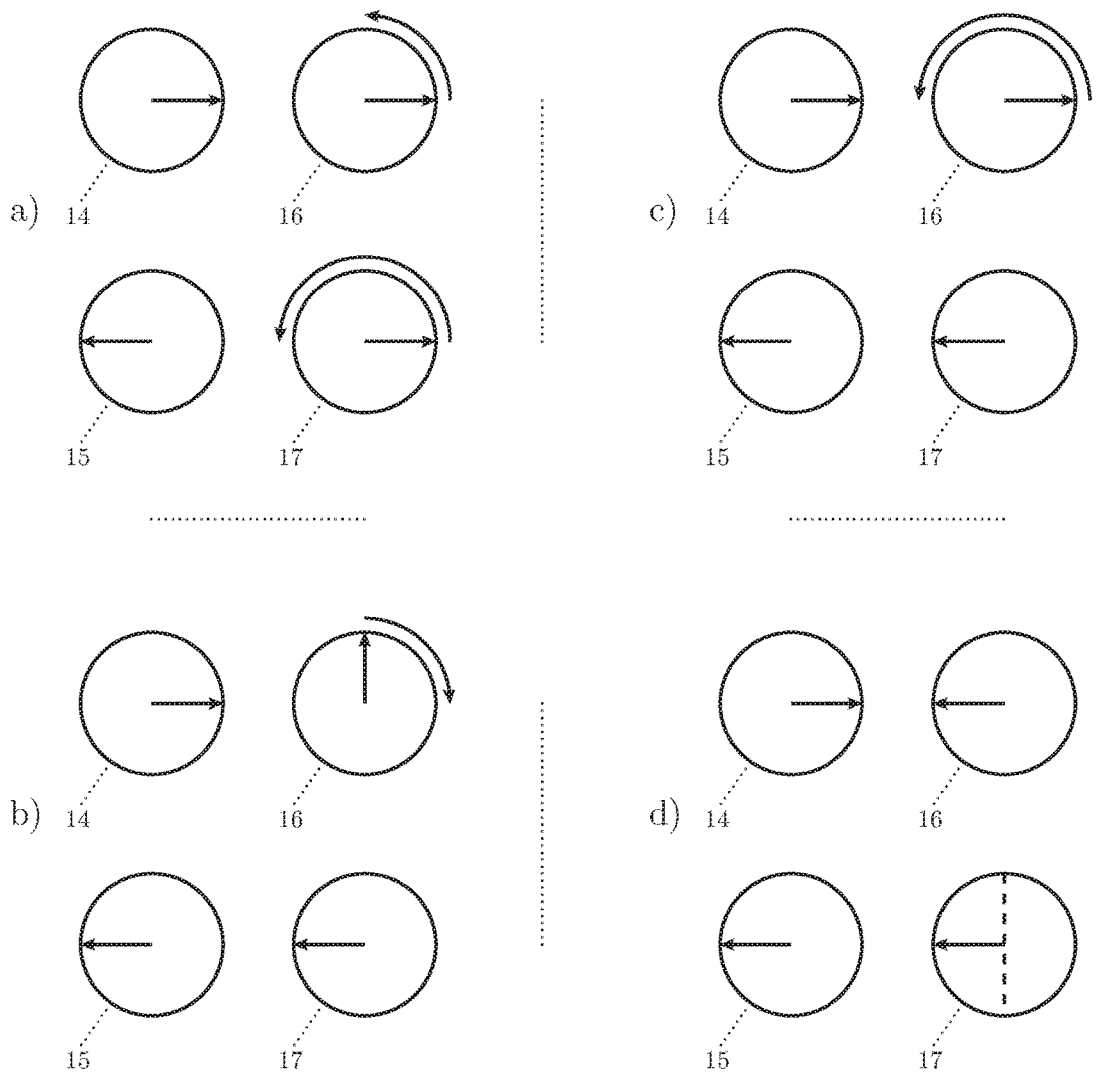
FIG. 16 The QAND gate uses the state of control bits 13 and 14 to control the state of scratch bit 15, such that the final state of bit 15 is true if 13 and 14 is true, and false otherwise. Scratch bit 16 is a temporary scratch bit, used to determine whether an even or odd number of control bits are true. In I, the states of 13 and 14 control the rotation of bits 15 and 16. In II, the projection of 16 on the $-z$ axis controls the rotation of bit 15. In III, the state of bit 15 is rotated by $\pi$. In IV, the state of bit 16 is measured along the $\hat{x}$ axis, yielding no information about whether an odd or even number of control bits are true.
Figure 17:
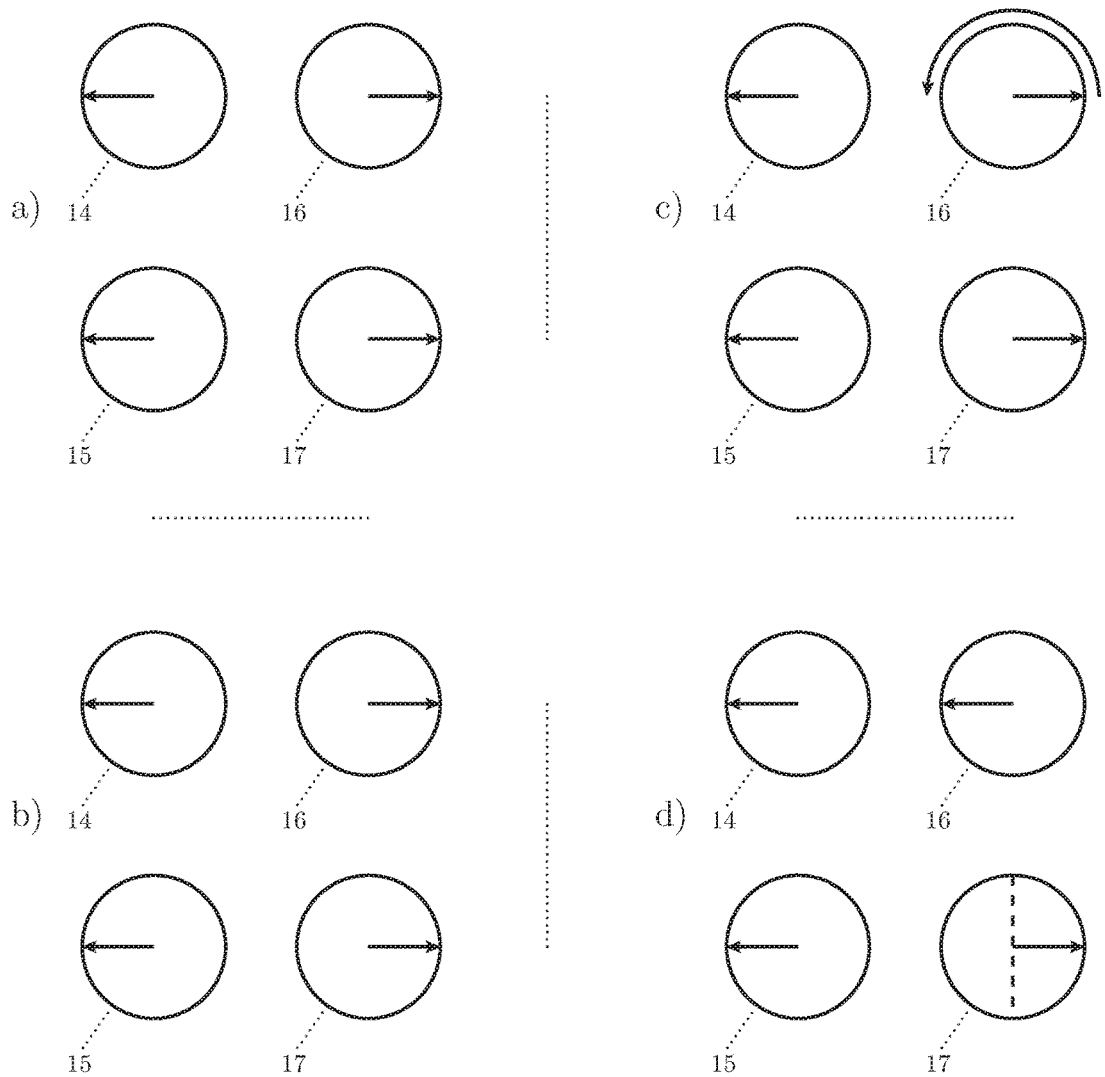
FIG. 17 The QAND gate uses the state of control bits 13 and 14 to control the state of scratch bit 15, such that the final state of bit 15 is true if 13 and 14 is true, and false otherwise. Scratch bit 16 is a temporary scratch bit, used to determine whether an even or odd number of control bits are true. In I, the states of 13 and 14 control the rotation of bits 15 and 16. In II, the projection of 16 on the $-z$ axis controls the rotation of bit 15. In III, 15 the state of bit 15 is rotated by $\pi$. In IV, the state of bit 16 is measured along the $\hat{x}$ axis, yielding no information about whether an odd or even number of control bits are true.
Figure 18:
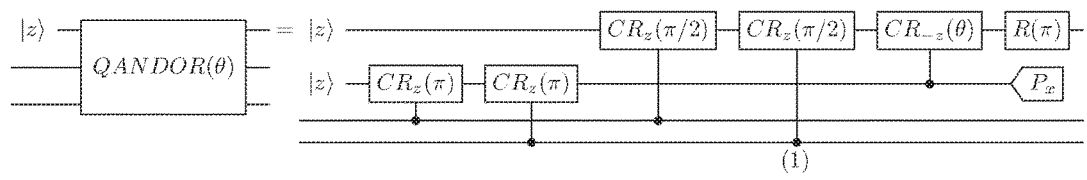
FIG. 18 Quantum circuit diagram for QANDOR gate.
Figure 19:
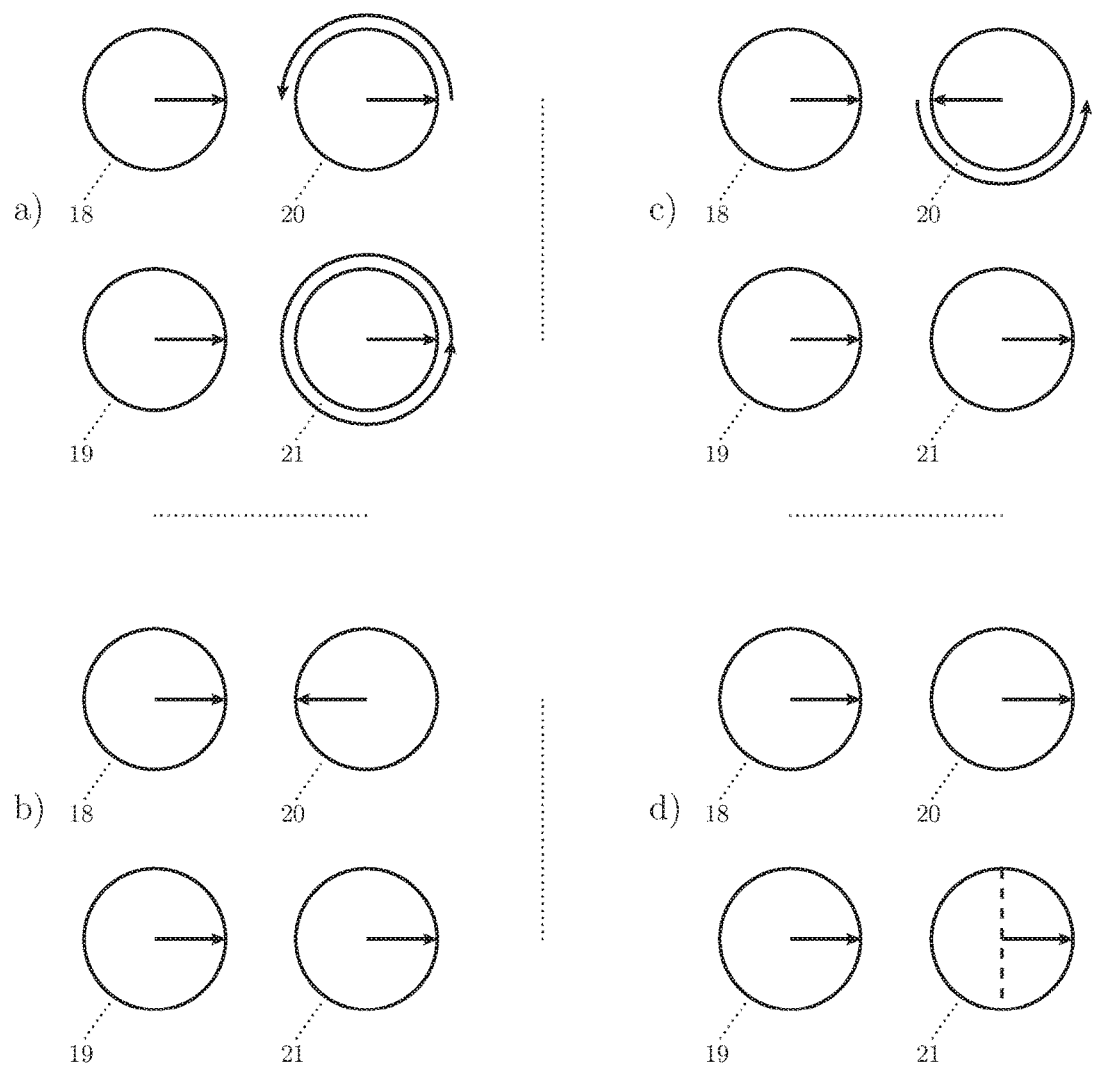
FIG. 19 The QANDOR gate uses the state of control bits 17 and 18 to control the state of scratch bit 19, such that the final state of 19 is true if 17 and 18 are true, false if 17 and 18 are false, and a superposition of true and false otherwise. Scratch bit 20 is a temporary scratch bit, used to determine whether an even or odd number of control bits are true. In I, the states of 17 and 18 control the rotation of bits 19 and 20. In II, the projection of 20 on the $-z$ axis controls the rotation of bit 19. In III, the state of bit 19 is rotated by $\pi$. In IV, the state of bit 20 is measured along the $\hat{x}$ axis, yielding no information about whether an odd or even number of control bits are true.
Figure 20:
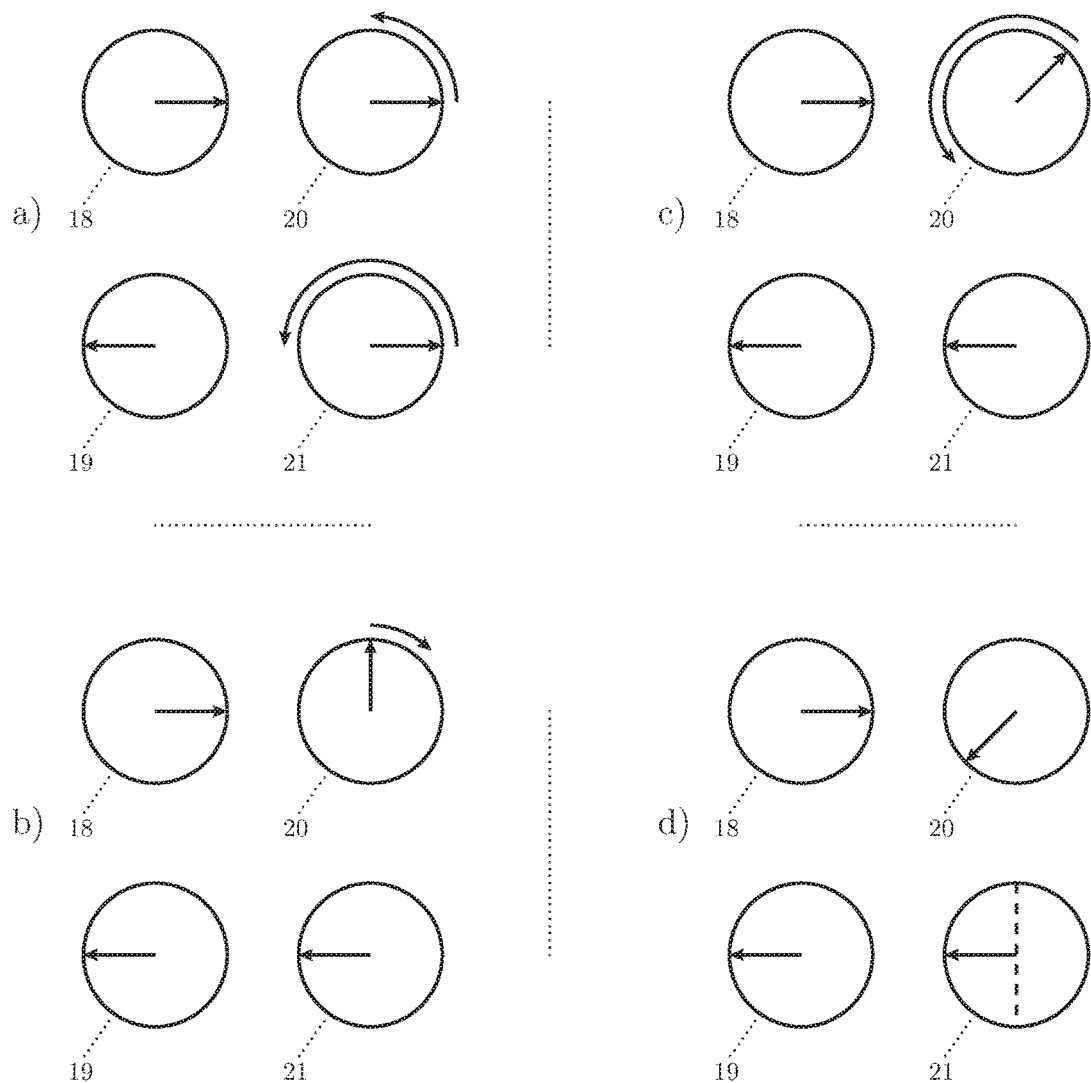
FIG. 20 The QANDOR gate uses the state of control bits 17 and 18 to control the state of scratch bit 19, such that the final state of 19 is true if 17 and 18 are true, false if 17 and 18 are false, and a superposition of true and false otherwise. Scratch bit 20 is a temporary scratch bit, used to determine whether an even or odd number of control bits are true. In I, the states of 17 and 18 control the rotation of bits 19 and 20. In II, the projection of 20 on the $-\hat{z}$ axis controls the rotation of bit 19, In III, the state of bit 19 is rotated by π. In IV, the state of bit 20 is measured along the $\hat{x}$ axis, yielding no information about whether an odd or even number of control bits are true.
Figure 21:
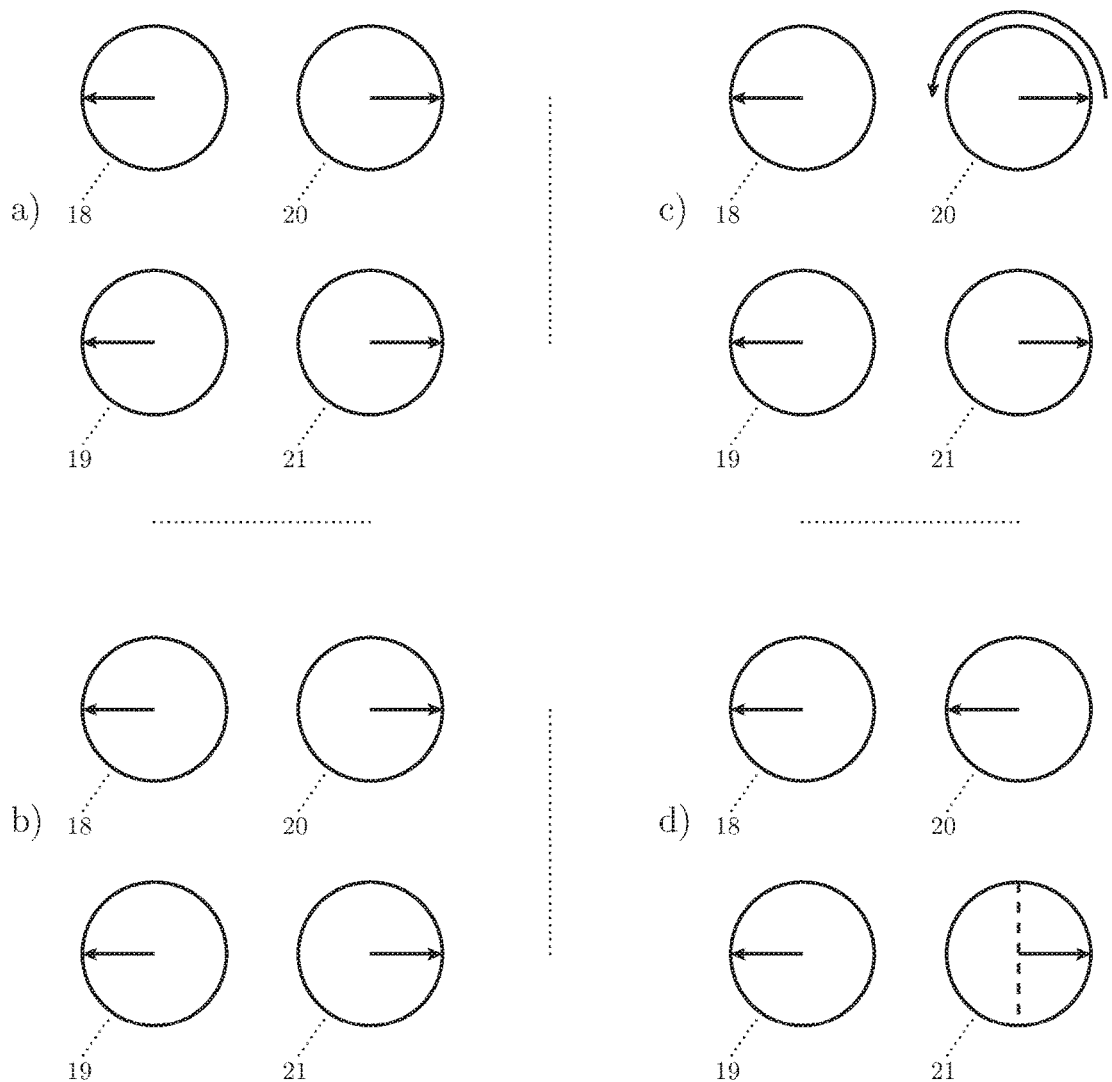
FIG. 21 The QANDOR gate uses the state of control bits 17 and 18 to control the state of scratch bit 19, such that the final state of 19 is true if 17 and 18 are true, false if 17 and 18 are false, and a superposition of true and false otherwise. Scratch bit 20 is a temporary scratch bit, used to determine whether an even or odd number of control bits are true. In I, the states of 17 and 18 control the rotation of bits 19 and 20. In II, the projection of 20 on the $-\hat{z}$ axis controls the rotation of bit 19. In III, the state of bit 19 is rotated by π. In IV, the state of bit 20 is measured along the $\hat{x}$ axis, yielding no information about whether an odd or even number of control bits are true.
Figure 22:
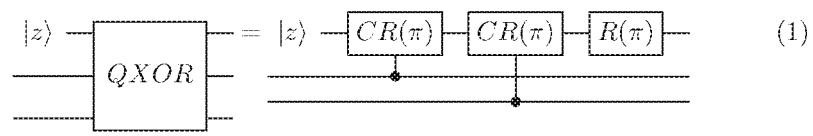
FIG. 22 Quantum circuit diagram for QXOR gate.
Figure 23:
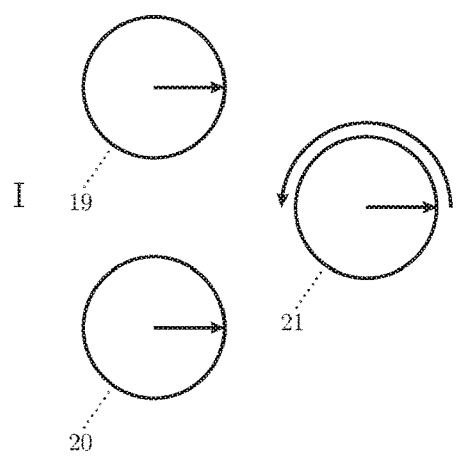
FIG. 23 The QXOR gate uses the state of control bits 21 and 22 to control the state of scratch bit 23, such that is true if 21 XOR 22 are true, and false otherwise. In I, a postive projection of 21 onto the $\hat{z}$ axis causes to rotate counterclockwise by π. In II, a positive projection of 22 onto the $\hat{z}$ axis causes to rotate counterclockwise by π. In III, rotates counterclockwise by π to yield a negative projection onto the $\hat{z}$ axis.
Figure 23:
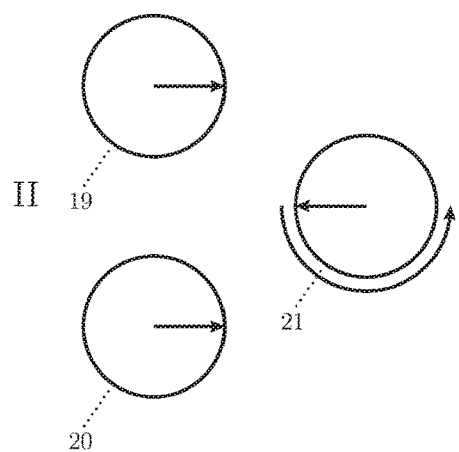
Figure 23:
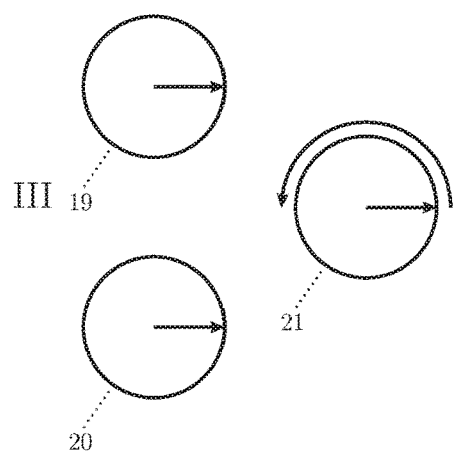
Figure 24:
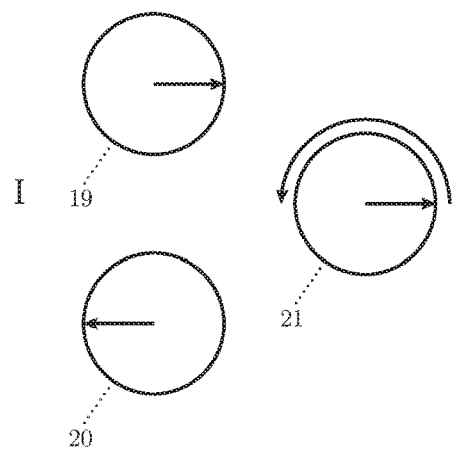
FIG. 24 The QXOR gate uses the state of control bits 21 and 22 to control the state of scratch bit 23, such that is true if 21 XOR 22 are true, and false otherwise. In I, a postive projection of 21 onto the $\hat{z}$ axis causes 23 to rotate counterclockwise by π. In II, a negative projection of 22 onto the $\hat{z}$ axis causes no net rotation of 23 In III, 23 rotates counterclocwise by π to yield a positive projection onto the $\hat{z}$ axis.
Figure 24:
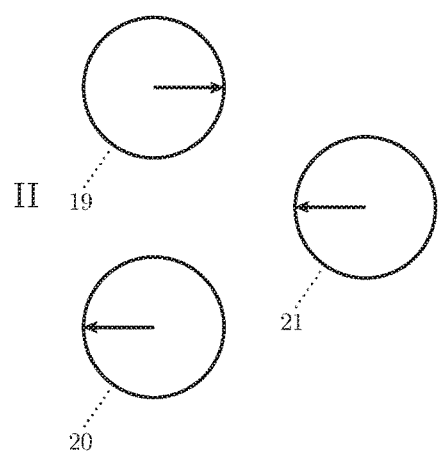
Figure 24:
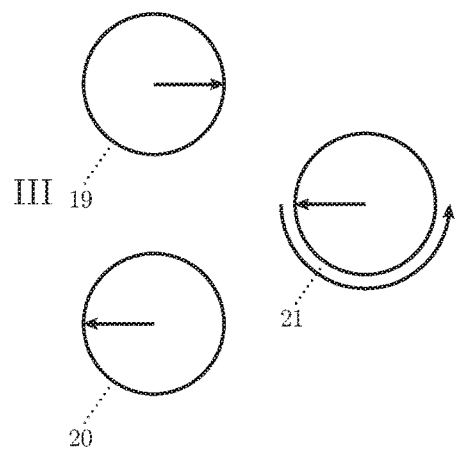
Figure 25:
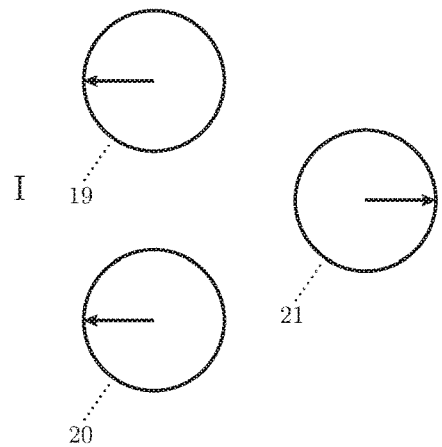
FIG. 25 The QXOR gate uses the state of control bits 21 and 22 to control the state of scratch bit 23, such that is true if 21 XOR 22 are true, and false otherwise. In I, a negative projection of 21 onto the $\hat{z}$ axis causes no net rotation of 23. In II, a negative projection of 22 onto the $\hat{z}$ axis causes no net rotation of 23 In III, 23 rotates counterclocwise by π to yield a negative projection onto the $\hat{z}$ axis.
Figure 25:
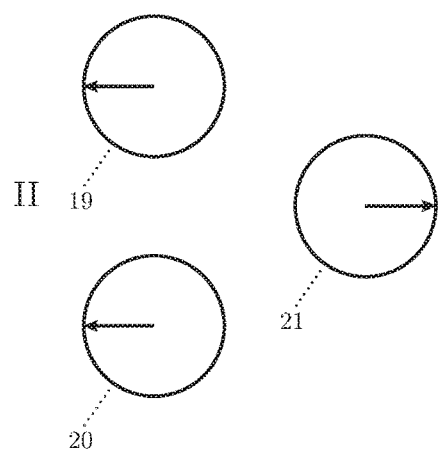
Figure 25:
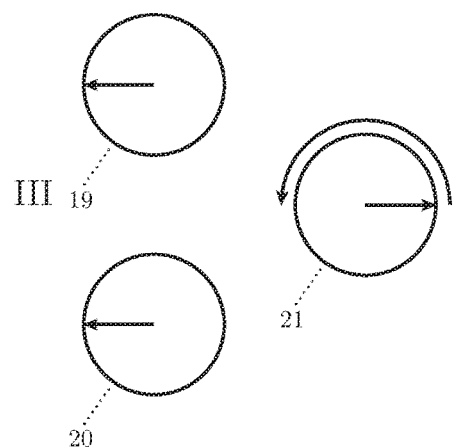

Here the state of bit n is used to rotate the scratch bit, which is used in turn to rotate the bit of state n. If bit n is originally true, the state of the scratch bit is $|+x\rangle$ after the first step, so that the second step rotates bit n by angle θ. If bit n is originally false, the first step rotates the scratch bit to $|-x\rangle$, and the second step rotates bit n by −θ. As the state of bit n is now encoded in the scratch bit's projection onto the x axis—the "axis of truth"—measurement along an axis orthogonal to this, such as the z axis, makes the rotation irreversible without measuring any information about the state of bit n. This gate is shown pictorially in FIG. 7, FIG. 8, and FIG. 9, showing the quantum circuit diagram plus the evolution of the individual bits in the cases when the self controlled bit has a positive projection on the control axis and a negative projection, respectively.

Written as a density matrix operation, the first two steps map $$\begin{pmatrix} 1 & 0 & 0 & 0 \\ 0 & 0 & 0 & 0 \\ 0 & 0 & 0 & 0 \\ 0 & 0 & 0 & 0 \end{pmatrix} \to \begin{pmatrix} \frac{1}{2}\cos^2\left(\frac{\theta}{2}\right) & \frac{\sin(\theta)}{4} & \frac{1}{2}\cos^2\left(\frac{\theta}{2}\right) & \frac{\sin(\theta)}{4} \\ \frac{\sin(\theta)}{4} & \frac{1}{2}\sin^2\left(\frac{\theta}{2}\right) & \frac{\sin(\theta)}{4} & \frac{1}{2}\sin^2\left(\frac{\theta}{2}\right) \\ \frac{1}{2}\cos^2\left(\frac{\theta}{2}\right) & \frac{\sin(\theta)}{4} & \frac{1}{2}\cos^2\left(\frac{\theta}{2}\right) & \frac{\sin(\theta)}{4} \\ \frac{\sin(\theta)}{4} & \frac{1}{2}\sin^2\left(\frac{\theta}{2}\right) & \frac{\sin(\theta)}{4} & \frac{1}{2}\sin^2\left(\frac{\theta}{2}\right) \end{pmatrix} \quad (26)$$

and $$\begin{pmatrix} 0 & 0 & 0 & 0 \\ 0 & 1 & 0 & 0 \\ 0 & 0 & 0 & 0 \\ 0 & 0 & 0 & 0 \end{pmatrix} \to \begin{pmatrix} \frac{1}{2}\sin^2\left(\frac{\theta}{2}\right) & \frac{\sin(\theta)}{4} & -\frac{1}{2}\sin^2\left(\frac{\theta}{2}\right) & -\frac{\sin(\theta)}{4} \\ \frac{\sin(\theta)}{4} & \frac{1}{2}\cos^2\left(\frac{\theta}{2}\right) & -\frac{\sin(\theta)}{4} & -\frac{1}{2}\cos^2\left(\frac{\theta}{2}\right) \\ -\frac{1}{2}\sin^2\left(\frac{\theta}{2}\right) & -\frac{\sin(\theta)}{4} & \frac{1}{2}\sin^2\left(\frac{\theta}{2}\right) & \frac{\sin(\theta)}{4} \\ -\frac{\sin(\theta)}{4} & -\frac{1}{2}\cos^2\left(\frac{\theta}{2}\right) & \frac{\sin(\theta)}{4} & \frac{1}{2}\cos^2\left(\frac{\theta}{2}\right) \end{pmatrix}, \quad (27)$$

where the order of the states is $|s,n\rangle = |+z, +z\rangle, |+z, -z\rangle, |-z, +z\rangle, |-z, -z\rangle$. Measuring the scratch bit along the z axis selects for either the upper left or bottom right 2×2 submatrix. Regardless of the measurement's outcome, bit n is rotated by angle θ if it has a positive projection on the z axis and −θ if it has a negative projection. Controlling the rotation of a bit by its projection onto an axis $\hat{i} = \cos(\phi)\hat{x} + \sin(\phi)\hat{z}$ other than $\hat{z}$ is accomplished by $$SCR_i^n(\theta) = R_y^n(\phi) SCR_z^n(\theta) R_y^n(-\phi). \quad (28)$$

d. Irreversible Quantum OR Gate

More sophisticated state manipulations are made possible by encoding the output of a logical operation into the state of a scratch bit. Define $$QOR^{c_1, c_2 \to s_2} = P_x^{s_1} R^{s_2}(\pi) CR_{-z}^{s_1 \to s_2}(\pi/2) \quad (29)$$
$$CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

Here the second scratch bit, initialized to be true, remains true if either or both of the control bits are true, and is rotated to false otherwise. As before, the negation of a variable can be used to control the state of the scratch bit by an appropriate set of sign changes. Before its measurement, the projection of scratch bit $s_1$ onto the $\hat{z}$ axis encodes whether an even or odd number of input variables $c_1$ and $c_2$ are true. If only one is true, $s_2$ is rotated by an additional $\pi/2$, so that TT, TF, and FT yield the same projection for $s_2$ onto the $\hat{z}$ axis. As is before, the negation of a variable can be used to control the state of the scratch bit by an appropriate set of sign changes. This gate is shown pictorially in FIG. 10, FIG. 11, FIG. 12, and FIG. 13, showing the quantum circuit diagram and the evolution of the individual bits in the cases when both input bits are true, one is true and the other false, and both false, respectively. Table 0.1 gives the states of the variable and scratch bits both before a QOR gate and after application of the gate but before measurement of any scratch bits.

A quantum NOR gate is found by omitting the final rotation of the scratch bit $$QNOR^{c_1, c_2 \to s_2} = P_x^{s_1} CR_{-z}^{s_1 \to s_2}(\pi/2) \quad (30)$$
$$CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

TABLE 0.1

QOR gate encodes the output of ($c_1 \vee c_2$) in the state of $s_2$.
Scratch bits $s_1$ and $s_2$ are initialized to be true ($|+\rangle$) before being entangled with the states of $c_1$ and $c_2$ by the QOR operator.
Here $|T\rangle = |+\rangle$ and $|F\rangle = |-z\rangle$.

| Initial State | Final State |
| --- | --- |
| $|c_1 c_2; s_1 s_2\rangle$ | $|c_1 c_2; s_1 s_2\rangle$ |
| $|TT; TT\rangle$ | $|TT; TT\rangle$ |
| $|TF; TT\rangle$ | $|TF; FT\rangle$ |
| $|FT; TT\rangle$ | $|FT; FT\rangle$ |
| $|FF; TT\rangle$ | $|FF; TF\rangle$ | e. Irreversible Quantum AND Gate

Using methods similar to the QOR gate, an irreversible AND gate can be obtained by changing the angle of the SCR gate from $\pi/2$ to $-\pi/2$.

$$QAND^{c_1,c_2 \to s_2} = P_x^{s_1} R^{s_2}(\pi) CR_{-z}^{s_1 \to s_2}(-\pi/2) \quad (31)$$
$$CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

This gate is shown pictorially in FIG. 14, FIG. 15, FIG. 16, and FIG. 17, showing the quantum circuit diagram and the evolution of the individual bits in the cases when both input bits are true, one true and one false, and both false, respectively.

A quantum NAND gate is found by omitting the final rotation of the scratch bit $$QNAND^{c_1,c_2 \to s_2} = P_x^{s_1} CR_{-z}^{s_1 \to s_2}(-\pi/2) \quad (32)$$
$$CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

f. Irreversible Gate ANDOR Gate Combining AND and OR Character

A gate which combines the character of AND and OR can be obtained by varying the angle of the SCR gate continuously between $-\pi/2$ and $\pi/2$.

$$QANDOR(\theta)^{c_1,c_2 \to s_2} = P_x^{s_1} R^{s_2}(\pi) CR_{-z}^{s_1 \to s_2}(\theta) \quad (33)$$
$$CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

This gate is shown pictorially in FIG. 18, FIG. 19, FIG. 20, and FIG. 21, showing the quantum circuit diagram and the evolution of the individual bits for the cases when both input bits are true, one true and one false, and both false, respectively. Here the scratch bit, initialized to be True, remains True if both inputs are True and flips to False if both inputs are False. If one input is True and the other False, the scratch bit will occupy a superposition of True and False $$|s\rangle = \cos(\pi/4 - \theta/2)|+z\rangle + \sin(\pi/4 - \theta/2)|-z\rangle. \quad (34)$$

A gate which combines NAND and NOR character in the same way as QANDOR can be found by omitting the final rotation of the scratch bit $$QNANDNOR(\theta)^{c_1,c_2 \to s_2} = \quad (35)$$
$$P_x^{s_1} CR_{-z}^{s_1 \to s_2}(\theta) CR_z^{c_2 \to s_2}(\pi/2) CR_z^{c_1 \to s_2}(\pi/2) CR_z^{c_2 \to s_1}(\pi) CR_z^{c_1 \to s_1}(\pi)$$

g. Irreversible Quantum XOR Gate

Using methods similar to the QOR and QAND gates, an irreversible XOR gate can be obtained by $$QXOR = R^s(\pi) CR_z^{m_1 \to s}(\pi) CR_z^{m_2 \to s}(\pi) \quad (36)$$

This gate is shown pictorially in FIG. 22, FIG. 23, FIG. 24, and FIG. 25, showing the quantum circuit diagram and the evolution of the individual bits for the cases when both input bits are true, one true and one false, and both false, respectively.

A quantum XNOR gate is obtained by omitting the final rotation of the scratch bit $$QXNOR = CR_z^{m_1 \to s}(\pi) CR_z^{m_2 \to s}(\pi) \quad (37)$$

TABLE 0.2

3OR gate encodes the output of $(c_1 \lor c_2 \lor c_3)$ in the state of $s_4$, where $s_1$ and $s_2$ are the scratch bits corresponding to the first QOR gate in Eq. 38 and $s_3$ and $s_4$ the scratch bits corresponding to the second QOR gate. Each scratch bit is initialized to be true ($|+z\rangle$) before being entangled with the state of the input bits.
Here the states of all four scratch bits are given prior to measurement, where $|T\rangle = |+z\rangle$ and $|F\rangle = |-z\rangle$.

| Initial State | Final State |
|---|---|
| $|c_1 c_2 c_3; s_1 s_2 s_3 s_4\rangle$ | $|c_1 c_2 c_3; s_1 s_2 s_3 s_4\rangle$ |
| $|TTT; TTTT\rangle$ | $|TTT; TTTT\rangle$ |
| $|TTF; TTTT\rangle$ | $|TTF; TTFT\rangle$ |
| $|TFT; TTTT\rangle$ | $|TFT; FTTT\rangle$ |
| $|TFF; TTTT\rangle$ | $|TFF; FTFT\rangle$ |
| $|FTT; TTTT\rangle$ | $|FTT; FTTT\rangle$ |
| $|FTF; TTTT\rangle$ | $|FTF; FTFT\rangle$ |
| $|FFT; TTTT\rangle$ | $|FFT; TFTT\rangle$ |
| $|FFF; TTTT\rangle$ | $|FFF; TFTF\rangle$ | h. Irreversible Quantum 3OR Gate

Use of two QOR gates and an intermediate scratch bit allows a second scratch bit to encode whether a particular quantum state satisfies a three variable logical clause $$3OR^{m_1,m_2,m_3 \to s_2} = P_x^{s_1} QOR^{m_3,s_1 \to s_2} QOR^{m_1,m_2 \to s_1}. \quad (38)$$

Figure 26:
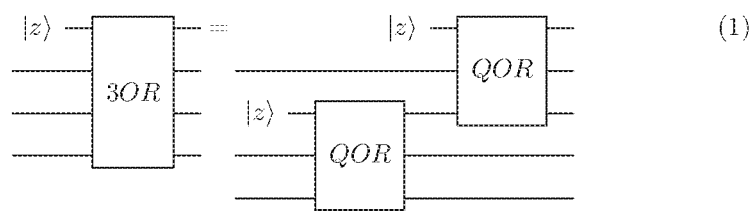
FIG. 26 Quantum circuit diagram for 3OR gate.
Figure 27:
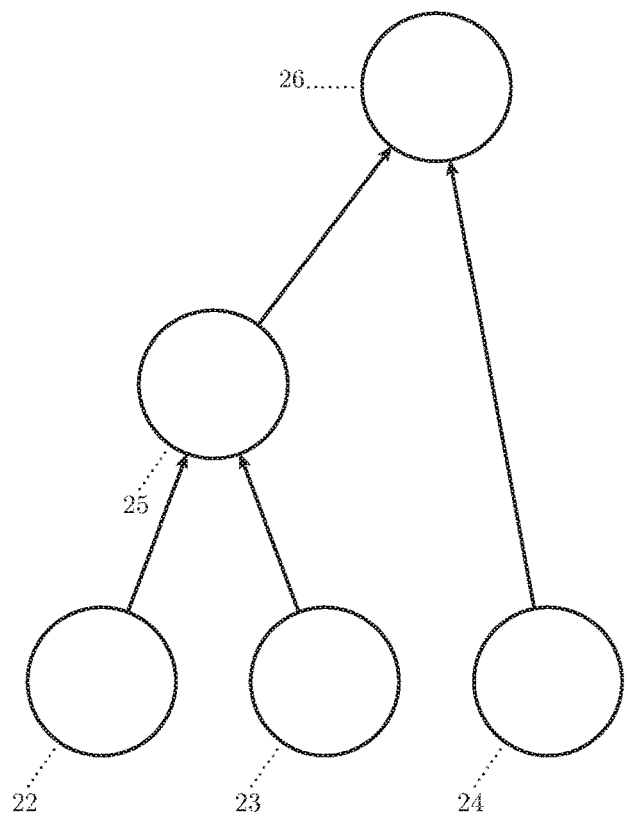
FIG. 27 The 3OR gate combines two QOR gates to yield a bit which is true if any of the input bits 24, 25, or 25 are true and false otherwise. Here a QOR gate using 24 and 25 as inputs yields output bit 27. A second QOR gate uses 27 and 26 to yield output bit 28. The temporary scratch bit 27 can be deleted by measurement orthogonal to the axis of truth if no information about the states of 24 and 25 is desired, or another axis to perform a partial measurement on the states of 24 and 25.
Figure 28:
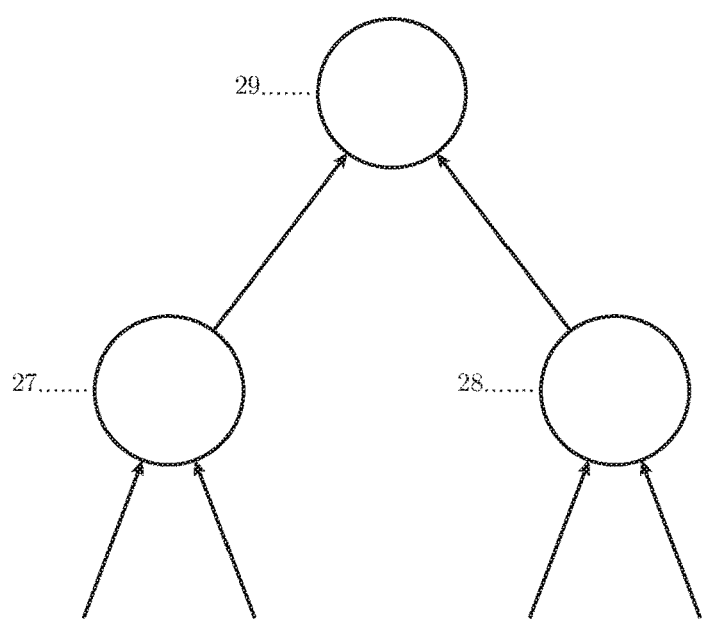
FIG. 28 A compound gate takes the states of bits 29 and 30 as inputs and yields bit 31 as output. Input bits may be variable bits or the outputs of other gates. After use in a compound gate, the states of input bits may be deleted or kept for further use.

Initializing both scratch bits to be true, $s_2$ remains true if the clause is satisfied, and is rotated to false otherwise. This gate is shown schematically in FIG. 26 and FIG. 27. More generally, chaining the outputs of QOR, QAND, and QANDOR gates yields compound gates which are shown pictorially in FIG. 28. Bit $s_1$, which encodes whether variables $m_1$ or $m_2$ are true, can be deleted by projection onto the $\hat{x}$ axis with $P_x^{s_1}$ as in Eq. 38, or kept for use in subsequent logical operations. Table 0.2 gives the states of the variable and scratch bits both before applying any rotations and after applying rotations but before measurement of any scratch bits.

i. Irreversible Quantum Decimation Gate

A 3SAT problem is solved only by a state which satisfies every clause in the problem. Because a 3OR gate encodes the satisfaction of a particular clause in the state of scratch bit $s_2$, it can be used to achieve a progressive decimation of the population for any state which fails to satisfy the clause by means of conditional rotation gates for all variables contained in clause M.

$$DEC^M(\theta) = P_x^s CR_{-z}^{s \to m_1}(\theta) \times CR_{-z}^{s \to m_2}(\theta) \times CR_{-z}^{s \to m_3}(\theta) \times 3OR^{m_1,m_2,m_3 \to s} \quad (39)$$

Figure 29:
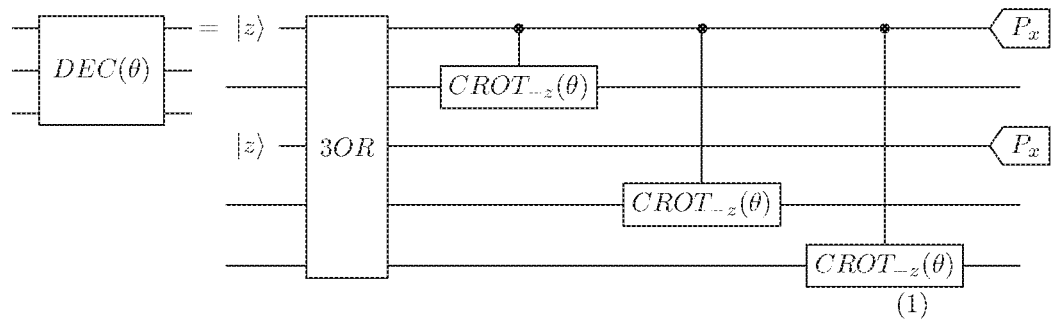
FIG. 29 Quantum circuit diagram for DEC gate.
Figure 30:
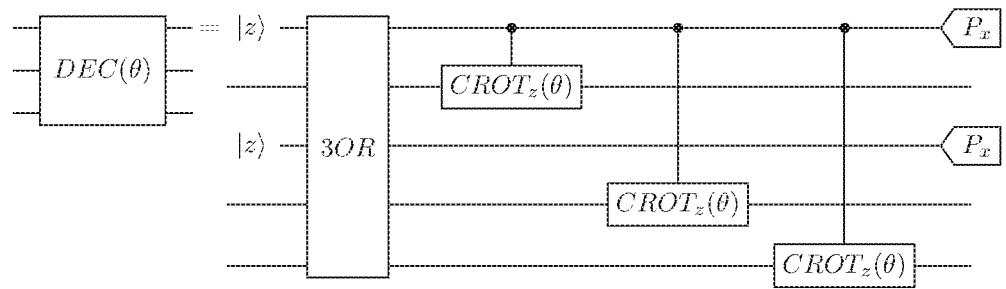
FIG. 30 The DEC gate decimates population for states which fail to satisfy some clause. Variable bits 32, 33, and 34 control the states of scratch bits 35 and 36 by means of the 3OR gate shown in FIG. 27. The state of bit 36 is then used to rotate the states of the variable bits by means of a controlled rotation (dashed lines). If the clause is satisfied, the variable bits are not rotated. If the clause is not satisfied, the variable bits are rotated by a decimation angle θ. Scratch bits 35 and 36 may be deleted or kept for further use.

If the clause is satisfied, the states of variables $X_{m_1}$, $X_{m_2}$, and $X_{m_3}$ are unaffected. If not, each variable is rotated by angle $\theta$ about the y axis. By rotating the state of each variable onto its opposite value, this decimation operator reduces the population of the original state and increases the population of states which are identical to the original state except for the variables in clause M. Measuring the scratch bit along the $\hat{x}$ axis makes this population transfer irreversible without giving any information regarding the satisfaction of the clause. This gate is shown pictorially in FIG. 29 and FIG. 30.

When tracing over the states of the scratch bits after measurement, all terms in which the state of a particular scratch bit is different on the bra side and the ket side will sum to zero. Writing $$P_x^{s_n}|\rho| = Tr_{s_n}|x_{s_n}\rangle \langle x_{s_n}|\rho|x_{s_n}\rangle \langle x_{s_n}|+|-x_{s_n}\rangle \langle -x_{s_n}|\rho|-x_{s_n}\rangle \langle -x_{s_n}|, \quad (40)$$

it can be seen that $$P_x^{s_n}[|T_{s_n}\rangle\langle T_{s_n}|]=P_x^{s_n}[|F_{s_n}\rangle\langle F_{s_n}|]=1, \quad (41)$$

and $$P_x^{s_n}[|T_{s_n}\rangle\langle T_{s_n}|]=P_x^{s_n}[|F_{s_n}\rangle\langle F_{s_n}|]=1, \quad (42)$$

In particular, measuring scratch bit $s_4$ eliminates cross terms $$P_x^{s_4}[|FFT;TTTT\rangle\langle FFT;TFTF|]=0, \quad (43)$$

$$P_x^{s_4}[|FTF;TTTT\rangle\langle FFT;TFTF|]=0, \quad (44)$$

$$P_x^{s_4}[|FFT;TTTT\rangle\langle FFT;TFTF|]=0, \quad (45)$$

and so on, where the ket side arises due to an initial state which satisfies the clause and the bra side from the rotation of initial state $|FFF\rangle$ due to the DEC operator, or vice versa. Because state $|FFF\rangle$ is the only state yielding $s_4=F$, all cross terms arising due to the conditional rotations of the decimation gate give zero contribution to the reduced density matrix.

A simple example of the decimation procedure is illustrated by using it to flip the state of a single variable. Here state $|\alpha\rangle$ evaluates to true for a particular clause, while state $|\alpha'\rangle$ evaluate to false. $|\alpha\rangle$ and $|\alpha'\rangle$ are identical except for the state of variable m. Because the satisfaction of the clause is encoded in the state of the scratch variable, the density matrix after the 3OR operator but before the conditional rotation can be written $$\rho = \begin{pmatrix} \rho_{\alpha\alpha} & 0 & 0 & \rho_{\alpha\alpha'} \\ 0 & 0 & 0 & 0 \\ 0 & 0 & 0 & 0 \\ \rho_{\alpha'\alpha} & 0 & 0 & \rho_{\alpha'\alpha'} \end{pmatrix}, \quad (46)$$

with state ordering $|T, \alpha\rangle$, $|T, \alpha'\rangle$, $|F, \alpha\rangle$, $|F, \alpha'\rangle$.

When the state of the scratch bit is used to rotate the state of the variable bit $x_m$ according to $CR^{s \to m}$, the density matrix becomes $$\rho = \begin{pmatrix} \rho_{\alpha\alpha} & 0 & \rho_{\alpha\alpha'}\sin(\theta) & -\rho_{\alpha\alpha'}\cos(\theta) \\ 0 & 0 & 0 & 0 \\ \rho_{\alpha'\alpha}\sin(\theta) & 0 & \rho_{\alpha'\alpha'}\sin^2(\theta) & -\rho_{\alpha'\alpha'}\cos(\theta)\sin(\theta) \\ -\rho_{\alpha'\alpha}\cos(\theta) & 0 & -\rho_{\alpha'\alpha'}\cos(\theta)\sin(\theta) & \rho_{\alpha'\alpha'}\cos^2(\theta) \end{pmatrix}. \quad (47)$$

The transfer of population from $\alpha'$ to $\alpha$ is completed by operator $P_x^s$, measuring the state of the scratch bit along an axis orthogonal to $\hat{z}$, the "axis of truth," to yield $$\rho = \begin{pmatrix} \frac{1}{2}(\rho_{\alpha'\alpha'}\sin^2(\theta)+\rho_{\alpha\alpha}) & 0 & \frac{1}{2}(\rho_{\alpha\alpha'}+\rho_{\alpha'\alpha})\sin(\theta) & 0 \\ 0 & \frac{1}{2}\rho_{\alpha'\alpha'}\cos^2(\theta) & 0 & 0 \\ \frac{1}{2}(\rho_{\alpha\alpha'}+\rho_{\alpha'\alpha})\sin(\theta) & 0 & \frac{1}{2}(\rho_{\alpha'\alpha'}\sin^2(\theta)+\rho_{\alpha\alpha}) & 0 \\ 0 & 0 & 0 & \frac{1}{2}\rho_{\alpha'\alpha'}\cos^2(\theta) \end{pmatrix}, \quad (48)$$

where the transfer of population depends on the initial population of $\alpha'$ and the rotation angle, but not on the off-diagonal coherence terms $\rho_{\alpha\alpha'}$ or $\rho_{\alpha'\alpha}$. Because this rotation angle controls the degree to which the initial state population is decimated, it may also be referred to as a "decimation angle."

Finally, tracing over the state of the scratch bit yields the new reduced density matrix $$\rho = \begin{pmatrix} \rho_{\alpha\alpha} + \rho_{\alpha'\alpha}\sin^2(\theta) & 0 \\ 0 & \rho_{\alpha'\alpha'}\cos^2(\theta) \end{pmatrix}, \quad (49)$$

where the transfer of population depends on the initial population of $\alpha'$ and the rotation angle, but not on the off-diagonal coherence terms $\rho_{\alpha\alpha'}$ or $\rho_{\alpha'\alpha}$.

j. Irreversible Global Decimation Gate

This decimation procedure can now be applied to each clause in the problem to create a global decimation gate $$SATDEC(\mathfrak{O}, \vec{\theta}) = \prod_M DEC^M(\theta_M), \quad (50)$$

where $\mathfrak{O}$ gives the order in which the clauses are decimated and $\theta_M$ gives the decimation angle for clause M. By construction, a state which satisfies every clause is unchanged by SATDEC, while every nonsolution state is decimated by at least one clause.

V. Algorithm For Solving 3SAT

As defined above, application of a SATDEC gate corresponds to applying a decimating DEC gate corresponding to every logical clause in the 3SAT problem of interest.

The change of probability for state s due to a single application of SATDEC is given by $$\Delta P_s = \sum_{s'} T_{s' \to s} P_{s'} - T_{s \to s'} P_s, \quad (51)$$

where the transfer matrix T depends parametrically on the order of the clauses and the associated rotation angles: $T = T(\mathfrak{O}, \vec{\theta})$. As the transfer of population goes as $\sin^2(\theta)$, to leading order it is quadratic in the decimation angle. The rate of convergence to equilibrium is given by the decay of the slowest eigenvectors. Note that because $T_{s' \to s}$ is nonsymmetric, its eigenvectors are not orthogonal.

Conservation of total probability means that any eigenstate with nonzero eigenvalue must have zero trace, while the restriction that $P_s \leq 1$ for all s means that all nonzero eigenvalues must be negative. As a solution state $s^*$ is never decimated, $T_{s^* \to s} = 0$ for all s.

Provided that at least one solution state s* exists, every eigenvector of $T_{s \to s'}$ must contain at least one solution state.

Each state s contained in eigenvector $\vec{\lambda}$ which does not solve the problem must fail at least one clause, and be projected by the decimation algorithm onto state s', defined to be equal to s for variables outside the clause and to s* for variables within the clause. If s' is not a solution, it in turn must fail some clause and be projected onto s'', equal to s' for variables outside the new clause and s* for variables within. For a finite number of clauses, this procedure must terminate with s* or some other solution state. In particular, there are no eigenvectors with zero eigenvalue consisting only of non solution is states.

a. Convergence to Equilibrium

The rate of convergence for the decimation algorithm is limited by the existence of eigenvectors with small eigenvalues. Let $\theta_0$ be the smallest decimation angle corresponding to a clause in the problem of interest. Define a quickly decaying eigenvector to have $\lambda$ comparable to or larger than $\theta_0^2$, and a slowly decaying eigenvector to have $\lambda \ll \theta_0^2$. Although there is no minimum magnitude for such eigenvalues, the requirement that $\lambda$ be small uniquely determines the slowly decaying eigenvector. Writing Eq. 51 as an eigenvalue equation $$\sum_{s'} T_{s' \to s} P_{s'} = T_{s \to s'} P_s - \lambda P_s, \tag{52}$$

$\lambda \ll \theta_0^2$ is negligible relative to $T_{s \to s'}$ unless $T_{s \to s'} =$ for all s'—that is to say, unless s is a solution state.

The populations of nonsolution states for the slowly decaying eigenvector can be found by setting $$\sum_{s'} T_{s' \to s} P_{s'} = \sum_{s'} T_{s \to s'} P_s \tag{53}$$

for all nonsolution states s and s' and requiring that $\Sigma_s P_s = 1$. Populations of solution states for this eigenvector are found by setting $$\Delta P_{s*} = \sum_{s'} T_{s' \to s*} P_{s'}. \tag{54}$$

for all solution states s*, requiring $\Delta P_{s*} = -\lambda P_{s*}$ for all s* and $\Sigma_{s*} P_{s*} = -1$. Note that if no solution exists, Eq. 53 defines the equilibrium probability distribution for the nonsolution states.

Because the probability distribution for the slowly decaying eigenstate is determined by the choice of decimation angles $\vec{\theta}$, the bottleneck of slowly decaying probability can be disrupted by changing $\vec{\theta}$ on each iteration of SATDEC. As this probability distribution may decay very slowly, it will be referred to as the "quasiequilibrium distribution".

The quasiequilibrium eigenvector can be found in two steps. First, Eq 53 is solved for the nonsolution populations and normalized such that $\Sigma_s P_s = 1$. Populations for the solution states are found by setting $$\Delta P_{s*} = \sum_{s'} T_{s' \to s*} P_{s'}. \tag{55}$$

for all solution states s*, and requiring $\Delta P_{s*} = -\nu P_{s*}$ for all s* and $\Sigma_{s*} P_{s*} = -1$, so that the full eigendistribution is traceless.

Because the condition that $\nu \ll \theta_0^2$ uniquely determines the probability distribution for the slowly decaying eigendistribution, the contrapositive is also true: any nonsolution eigendistribution other than that determined by Eqs. 53 and 55 must have decay rates comparable to or larger than $\theta_0^2$.

b. Decay of Nonsolution Probability

Repeated application of SATDEC for a given choice of decimation angles $\theta_M$ causes the probability distribution to evolve on two timescales. The probability distribution at a given time can be written as a sum over eigendistributions $$P_s = A_V \lambda_V^N \vec{V} + \sum_n A_n \lambda_n^N W_n + \sum_{s*} A_{s*} s*, \tag{56}$$

where $\vec{V}$ is the quasiequilibrium eigendistribution defined by Eqs. 53 and 55 and $\vec{W}_n$ are the remaining eigendistributions, with decay rates comparable to or greater than $\theta_0^2$. Repeated application of the same transfer matrix results in a rapid "blowoff" in which non-solution probability contained in quickly decaying eigendistributions is rapidly transferred to the set of solution states, followed by a long period of stagnation in which the nonsolution probability approaches the quasiequilibrium distribution, resulting in slow transfer to the solution states.

The slow decay of the quasiequilibrium distribution can be hastened by varying the decimation angles corresponding to different clauses. Because the slowly decaying eigendistribution is determined by $\vec{\theta}$ by way of Eq. 53, varying $\vec{\theta}$ non-adiabatically projects the original quasiequilibrium distribution into a new eigenbasis, in which the quasiequilibrium distribution may be substantially different. If $\vec{V}^{(1)}$ is the slowly decaying eigendistribution for transfer matrix $T^{(1)}$, and $\vec{V}^{(2)}$ the slowly and $\vec{W}_n^{(2)}$ the quickly decaying eigendistributions for transfer matrix $\vec{T}^{(2)}$, where $$T^{(2)} \vec{V}^{(1)} = (1 + A_V) \vec{V}^{(2)} + \sum_n A_n \vec{W}_n^{(2)}, \tag{57}$$

changing from transfer matrix $T^{(1)}$ to $T^{(2)}$ results in a second blowoff as the coefficients $A_n$ decay to zero.

The coefficient $A_V$ can be found by approximating the decay rate of the slowly decaying eigendistributions as zero, so that $$T^{(1)} V^{(1)} = V^{(1)} \tag{58}$$

$$T^{(2)} V^{(2)} = V^{(2)} \tag{59}$$

Let $\Delta T = T^{(2)} - T^{(1)}$ and $\Delta V = V^{(2)} - V^{(1)}$, so that Eq. 57 can be rewritten $$A_V \vec{V}^{(2)} + \sum_n A_n \vec{W}_2^{(2)} = -T^{(2)} \Delta V. \tag{60}$$

Expanding the population difference $$\Delta V = B_V V^{(2)} + \sum_n B_n \vec{W}_n^{(2)}, \tag{61}$$

in the eigenbasis of $T^{(2)}$, it follows that $$A_V = -B_V \frac{\Delta \vec{V} \cdot \vec{V}^{(2)}}{\vec{V}^{(2)} \cdot \vec{V}^{(2)}}, \tag{62}$$

so that the blowoff is largest when $\vec{V}^{(1)}$ and $\vec{V}^{(2)}$ are most dissimilar.

c. Back and Forth Iteration

A simple procedure for transferring population away from the slowly decaying eigendistribution is to randomly vary the decimation angles corresponding to particular clauses for one iteration of SATDEC, then revert to the original decimation angles to recover the original transfer matrix for the next iteration. Let $T^{(1)} = T(\vec{\theta}^{(1)})$ be the transfer matrix corresponding to setting $$\vec{\theta}^{(1)}[C] = \theta_0 \tag{63}$$

for every clause C, and $T^{(2)} = T(\vec{\theta}^{(2)})$, where $$\vec{\theta}^{(2)}[C] = \theta_0(1 + \eta \sigma_c), \tag{64}$$

and $\sigma_c$ is chosen to be 1 or −1 with equal probability.

Writing the transfer matrix $T = \Pi_C T^{(C)}$ as the product of transfer matrices due to individual clauses C, note that $T^{(C)}$ is quadratic in $\theta_C$, $$T^{(C)} \propto \theta_C^2 \rightarrow \theta_0^2(1 + 2\eta \sigma_C). \tag{65}$$

The change in population for state s for the slowly decaying eigendistribution due to this change in the transfer matrix can be written $$\Delta \vec{V}[s] = \sum_C \Delta V^{(C)}[s] + \Delta V^{(R)}[s], \tag{66}$$

where $\Delta V^{(C)}$ are first order corrections offsetting changes in $T^{(C)}$, while $\Delta V^{(R)}$ are residual corrections enforcing that the new quasiequilibrium distribution obeys Eq. 53.

To leading order, the change in population for state s due to a small change in the decimation angle is found by setting $$\sum_{s'} \left( \vec{V}[s] + \Delta \vec{V}^{(C)}[s] \right) \left( T^{(C)}_{s' \to s} + \Delta T^{(C)}_{s' \to s} \right) = \sum_{s'} \vec{V}[s] T^{(C)}_{s' \to s}, \tag{67}$$

so that after neglecting the doubly small term $\Delta T^{(C)}_{s' \to s} \Delta \vec{V}^{(C)}[s]$, $$\frac{\Delta \vec{V}^{(C)}[s]}{\vec{V}[s]} = -\frac{\sum_{s'}}{\Delta T^{(C)}_{s' \to s}} T^{(C)}_{s' \to s} = -2\eta \sigma_C. \tag{68}$$

Subtracting these terms from Eq. 66 yields a linear system for the remaining corrections $$\sum_{s',C} \left( \Delta \vec{V}^R[s] T^{(C)}_{s \to s'} - \Delta \vec{V}^R[s'] T^{(C)}_{s' \to s} \right) = \sum_{s',C' \neq C} \left( \Delta \vec{V}^{(C')}[s'] T^{(C)}_{s' \to s} - \Delta \vec{V}^{(C')}[s] T^{(C)}_{s \to s'} \right), \tag{69}$$

where the right hand side has expectation value 0.

The second step of the back and forth iteration changes all decimation angles back to their original values, so that $$\Delta T^{(C)} \to -\Delta T^{(C)} \tag{70}$$

and $$\Delta \vec{V} \to -\Delta \vec{V}, \tag{71}$$

and the slowly decaying eigendistribution $\vec{V}^{(2)}$ is projected into the eigenbasis of $T^{(1)}$.

Both changes to the transfer matrix result in a loss of total nonsolution probability, as population is transferred from the slowly decaying to the quickly decaying eigendistributions. The coefficient of the slowly decaying eigendistribution after the second transfer is given by $$\frac{A'_V}{A_V} = \left( 1 - \frac{\Delta \vec{V} \cdot \vec{V}^{(2)}}{\vec{V}^{(2)} \cdot \vec{V}^{(2)}} \right) \left( 1 + \frac{\Delta \vec{V} \cdot \vec{V}^{(2)}}{\vec{V}^{(2)} \cdot \vec{V}^{(2)}} \right). \tag{72}$$

Let $$\alpha = \frac{\sum_{C,s} \Delta \vec{V}[s] \vec{V}[s]}{\sum_s \vec{V}[s] \vec{V}[s]} = \frac{\sum_C \sigma_C \eta \sum_s \vec{V}[s] \vec{V}[s]}{\sum_s \vec{V}[s] \vec{V}[s]} \tag{73}$$

and $$\beta = \frac{\sum_s \Delta \vec{V}^R[s] \vec{V}[s]}{\sum_s \vec{V}[s] \vec{V}[s]}, \tag{74}$$

so that $$\frac{A'_V}{A_V} = 1 - \alpha^2 - \alpha \beta - \beta^2. \tag{75}$$

Then $$\alpha^2 = \frac{\sum_{C,C'} \sigma_C \sigma_{C'} \eta^2 \sum_{s,s'} \vec{V}[s] \vec{V}[s']}{\sum_{s,s'} \vec{V}[s] \vec{V}[s']} \tag{76}$$

Because $\sigma_C$ and $\sigma_{C'}$ are independent random variables with mean value 0, $$\sum_C \sigma_C = 0 \tag{77}$$

and

-continued $$\sum_{C,C'} \sigma_C^s \sigma_{C'}^s = \sum_C \sigma_C^2 = N_C^s \quad (78)$$

where $N_C^s$ is the number of clauses failed by state s, so that $N_C^s \geq 1$ for every nonsolution state. From this it follows that the expectation value $$\left\langle \frac{A_V'}{A_V} \right\rangle \leq (1 - \eta^2), \quad (79)$$

so that the loss of population from the slowly decaying eigendistributions due to a back and forth iteration cycle is controlled by a the user controlled parameter $\eta$. Choosing $\eta > \sqrt{2}\theta_0$ ensures that all nonsolution probability decays on a timescale which is large relative to $\theta_0^2$.

VI. A Worked Example of Back and Forth Iteration

A simple example of back and forth iteration is obtained by solving a three variable 3SAT problem in which $|TTT\rangle$ is the only solution. This corresponds to performing DEC operations for clauses 0-6 of Table 0.3. Each state other than $|TTT\rangle$ fails a single clause, and to leading order in $\theta_C$ it is decimated by transferring population to the three states in which a single variable has been flipped. Choosing $\theta_C = \theta_0 = 0.1$ for all clauses and including

TABLE 0.3

Each of the eight three variable states fails a single clause. To leading order, the DEC operator for this clause depopulates the state which fails the clause and populates the three states which differ from this state by a single variable.

| # | Clause | State Decimated | States Populated |
|---|---|---|---|
| 0 | $(X_1 \vee X_2 \vee X_3)$ | $|FFF\rangle$ | $|FFT\rangle, |FTF\rangle, |TFF\rangle$ |
| 1 | $(X_1 \vee X_2 \vee \neg X_3)$ | $|FFT\rangle$ | $|FFF\rangle, |FTT\rangle, |TFT\rangle$ |
| 2 | $(X_1 \vee \neg X_2 \vee X_3)$ | $|FTF\rangle$ | $|FTT\rangle, |FFF\rangle, |TTF\rangle$ |
| 3 | $(\neg X_1 \vee \neg X_2 \vee \neg X_3)$ | $|FTT\rangle$ | $|FTF\rangle, |FFT\rangle, |TTT\rangle$ |
| 4 | $(\neg X_1 \vee X_2 \vee X_3)$ | $|TFF\rangle$ | $|TFT\rangle, |TTF\rangle, |FFF\rangle$ |
| 5 | $(\neg X_1 \vee X_2 \vee \neg X_3)$ | $|TFT\rangle$ | $|TFF\rangle, |TTT\rangle, |FFT\rangle$ |
| 6 | $(\neg X_1 \vee \neg X_2 \vee X_3)$ | $|TTF\rangle$ | $|TTT\rangle, |TFF\rangle, |FTF\rangle$ |
| 7 | $(\neg X_1 \vee \neg X_2 \vee \neg X_3)$ | $|TTT\rangle$ | $|TTF\rangle, |TFT\rangle, |FTT\rangle$ | terms to leading order in $\theta$ yields transfer matrix $$T^{(1)} = \begin{pmatrix} 0.97 & 0.01 & 0.01 & 0.0 & 0.01 & 0.0 & 0.0 & 0.0 \\ 0.01 & 0.97 & 0.0 & 0.01 & 0.0 & 0.01 & 0.0 & 0.0 \\ 0.01 & 0.0 & 0.97 & 0.01 & 0.0 & 0.0 & 0.01 & 0.0 \\ 0.0 & 0.01 & 0.01 & 0.97 & 0.0 & 0.0 & 0.0 & 0.0 \\ 0.01 & 0.0 & 0.0 & 0.0 & 0.97 & 0.01 & 0.01 & 0.0 \\ 0.0 & 0.01 & 0.0 & 0.0 & 0.01 & 0.97 & 0.0 & 0.0 \\ 0.0 & 0.0 & 0.01 & 0.0 & 0.01 & 0.0 & 0.97 & 0.0 \\ 0.0 & 0.0 & 0.0 & 0.01 & 0.0 & 0.01 & 0.01 & 1.0 \end{pmatrix} \quad (80)$$

where the state ordering is taken from table 0.3. The eigenvalues and eigendistributions of this transfer matrix are given by Table 0.4.

TABLE 0.4

Eigenvalues and eigendistributions of $T^{(1)}$.

| Eigendistribution | $\lambda$ | $\vec{\lambda}$ |
|---|---|---|
| $\vec{s}^*$ | 1.0 | (0.0, 0.0, 0.0, 0.0, 0.0, 0.0, 0.0, 1.0) |
| $\vec{V}^{(1)}$ | 0.996 | (−0.165, −0.146, −0.146, −0.11, −0.146, −0.11, −0.11, 0.934) |
| $\vec{W}_1^{(1)}$ | 0.98 | (−0.0, 0.577, −0.289, 0.289, −0.289, 0.289, −0.577, 0.0) |
| $\vec{W}_2^{(1)}$ | 0.98 | (0.0, −0.086, −0.452, −0.537, 0.537, 0.452, 0.086, 0.0) |
| $\vec{W}_3^{(1)}$ | 0.97 | (0.707, 0.0, −0.0, −0.354, −0.0, −0.354, −0.354, 0.354) |
| $\vec{W}_4^{(1)}$ | 0.96 | (−0.0, −0.577, 0.289, 0.289, 0.289, 0.289, −0.577, 0.0) |
| $\vec{W}_5^{(1)}$ | 0.96 | (0.0, 0.128, −0.551, 0.424, 0.424, −0.551, 0.128, 0.0) |
| $\vec{W}_6^{(1)}$ | 0.944 | (−0.457, 0.403, 0.403, −0.305, 0.403, −0.305, −0.305, 0.162) |

Setting $\eta = 0.2$ and $\vec{\sigma} = (1,1,1,1,-1,-1,-1)$ changes the transfer matrix to $$T^{(2)} = \begin{pmatrix} 0.957 & 0.014 & 0.014 & 0.0 & 0.006 & 0.0 & 0.0 & 0.0 \\ 0.014 & 0.957 & 0.0 & 0.014 & 0.0 & 0.006 & 0.0 & 0.0 \\ 0.014 & 0.0 & 0.957 & 0.014 & 0.0 & 0.0 & 0.006 & 0.0 \\ 0.0 & 0.014 & 0.014 & 0.957 & 0.0 & 0.0 & 0.0 & 0.0 \\ 0.014 & 0.0 & 0.0 & 0.0 & 0.981 & 0.006 & 0.006 & 0.0 \\ 0.0 & 0.014 & 0.0 & 0.0 & 0.006 & 0.981 & 0.0 & 0.0 \\ 0.0 & 0.0 & 0.014 & 0.0 & 0.006 & 0.0 & 0.981 & 0.0 \\ 0.0 & 0.0 & 0.0 & 0.014 & 0.0 & 0.006 & 0.006 & 1.0 \end{pmatrix} \quad (81)$$

with eigenvalues and eigendistributions given by Table 0.5.

TABLE 0.5

Eigenvalues and eigendistributions of $T^{(2)}$.

| Eigenstate | $\lambda$ | $\vec{\lambda}$ |
|---|---|---|
| $\vec{s}^*$ | 1.0 | (0.0, 0.0, 0.0, 0.0, 0.0, 0.0, 0.0, 1.0) |
| $\vec{V}^{(2)}$ | 0.997 | (−0.101, −0.088, −0.088, −0.064, −0.234, −0.175, −0.175, 0.924) |
| $\vec{W}_1^{(2)}$ | 0.984 | (0.0, −0.161, 0.161, −0.0, −0.0, −0.689, 0.689, 0.0) |
| $\vec{W}_2^{(2)}$ | 0.98 | (−0.205, −0.322, −0.322, −0.399, 0.702, 0.19, 0.19, 0.166) |
| $\vec{W}_3^{(2)}$ | 0.974 | (0.233, 0.02, 0.02, 0.034, 0.534, −0.546, −0.546, 0.25) |
| $\vec{W}_4^{(2)}$ | 0.955 | (0.617, 0.043, 0.043, −0.654, −0.377, 0.069, 0.069, 0.189) |
| $\vec{W}_5^{(2)}$ | 0.953 | (0.0, −0.626, 0.626, −0.0, −0.0, 0.329, −0.329, 0.0) |
| $\vec{W}_6^{(2)}$ | 0.926 | (−0.492, 0.482, 0.482, −0.457, 0.165, −0.147, −0.147, 0.115) |

Note that in both Table 0.4 and Table 0.5, the decay rate for and $\vec{V}^{(1)}$ and $V^{(2)}$ is small relative to $\theta_0^2 = 0.01$, while the decay rates for eigendistributions $\vec{W}_n$ are comparable to this value or larger.

Changing the transfer matrix from $T^{(1)}$ to $T^{(2)}$ projects $V^{(1)}$ into the new eigenbasis $$\vec{V}^{(1)} = 1.0005 \vec{V}^{(2)} + 0.163 \vec{W}_2^{(2)} - 0.085 \vec{W}_3^{(2)} - 0.028 \vec{W}_4^{(2)} - 0.005 \vec{W}_6^{(2)}. \quad (82)$$

Once the coefficients of the quickly decaying eigendistributions $\vec{W}_n$ have decayed to zero, returning to the original transfer matrix projects $V^{(2)}$ into the original eigenbasis $$\vec{V}^{(2)} = 0.956\vec{V}^{(1)} + 0.055\vec{W}_1^{(1)} - 0.13\vec{W}_2^{(1)} - 0.085$$
$$\vec{W}_3^{(1)} - 0.014\vec{W}_4^{(1)} - 0.018\vec{W}_5^{(1)} 0.0007\vec{W}_6^{(1)}, \quad (83)$$

so that the coefficient of $\vec{V}^{(1)}$ after the back and forth iteration is $1.005*0.956 = 0.96 \approx 1 - \eta^2$.

a. Algorithmic Running Time

Recalling that the quickly decaying eigenvectors have eigenvalues on the order of $\theta_0^2$ or larger and choosing $\eta > \sqrt{2}\theta_0$, the number of SATDEC iterations required to achieve total solution probability $\alpha$ is approximately $$N_{iterations} = \frac{\log(1-\alpha)}{\log(1-\theta_0^2)}. \quad (84)$$

As each iteration requires a constant number of operations per clause, the running time for the algorithm as a whole scales linearly with the number of clauses in the problem.

Measuring the projection of each bit which corresponds to a variable along the $\hat{z}$ axis, and recalling that $|+z\rangle$ corresponds to True and $|-z\rangle$ to False, generates a potential solution to the 3SAT problem of interest, which can be straightforwardly checked for correctness using a classical computer. If the problem is not solvable, the potential solution will always be invalid. If the problem is solvable, this procedure will generate a valid solution with probability $\alpha$ and an invalid solution with probability $1-\alpha$. Following the conventions of probabilistic algorithms, it is therefore necessary to choose $N_{iterations}$ such that $1-\alpha \leq \frac{1}{3}$.

VII. Comparison to Existing Algorithms a. Comparison with Schöning Algorithm

The algorithm described above is similar in spirit to the probabilistic classical algorithm of Schöning [14], In the Schöning algorithm, the value of each variable is initially chosen at random. The satisfaction of each clause is then tested, and the failure of any clause is addressed by randomly flipping the state of one of the variables in the clause. If no satisfying assignment is found after testing $3N_V$ clauses, the process is restarted using a new random initial state.

The distinction between the two algorithms arises from the quantum nature of the system being operated on. In the current algorithm, the system consists of an incoherent superposition of many different states, while a classical algorithm is constrained to occupy a single state at a time. Schöning's algorithm can be emulated by measuring the states of each variable bit along the axis of truth after every decimation operation, thereby forcing the system to occupy a single state. Because the current algorithm does not transfer all probability away from the initial state, the steps of decimation followed by measurement must be repeated until one of the variable bit changes.

Here the act of measurement fundamentally alters the behavior of the algorithm. Treating each failed clause as a branch point, the current algorithm transfers a fraction of the probability to occupy the initial state along every branch, while the Schöning algorithm transfers the entire probability along a single branch chosen at random. In the language of computer science, the current algorithm is executing a parallel breadth first search for a solution state, while the Schöning algorithm executes a randomized depth first search—a random walk.

The flow of population due to a single DEC gate in the current algorithm can be emulated classically by summing over all random walks and all possible initial states, weighted by the initial probability of occupying a state and the probability of taking a particular walk. However, this classical emulation algorithm is very inefficient. Whereas the quantum algorithm requires a constant number of operations to implement a DEC gate, the classical algorithm requires a summation over all $2^{N_V}$ initial states. Thus, the existence of a polynomial time quantum algorithm does not imply the existence of a polynomial time classical emulation algorithm.

b. Comparison with Fixed Point Quantum Search

The algorithm described above has the property that population can be transferred to solution states, but never away. Because a solution state satisfies all clauses, it is a fixed point of the iteration. Conceptually, this is similar to the fixed point, quantum search algorithm of Tulsi et al [5, 15, 10, 7, 6], in which a single oracle bit is used to rotate a source state $|s\rangle$ in a 2d subspace consisting of $|s\rangle$ and a solution state $|s*\rangle$ which satisfies the problem. As described in [15], fixed point searches have the desirable properties that the initial state is guaranteed to evolve toward the target state, even when the algorithm is not run to completion, and any errors due to imperfect transformations in earlier iterations are wiped out by subsequent iterations, as long as the state remains in the problem defining space. However, existing fixed point searches have thus far offered no speed advantages relative to non fixed point algorithms. [15] yields running times comparable to classical search, while running times for [10] vary continuously from the $\mathcal{O}(\sqrt{n})$ running time characteristic of the Grover search algorithm, where n is the total number of states, to the $\mathcal{O}(n)$ of classical search with the variation of a damping parameter.

The present algorithm differs from existing fixed point algorithms by making use of information specific to 3SAT which is not available for the general case of an unordered database search—the condition that a valid solution must satisfy each clause in the problem. Rather than using a single oracle bit to encode the satisfaction of the entire problem, it makes use of multiple bits which encode the satisfaction of individual clauses. Rather than transferring population directly from a source state to a target state, a decimation operator acts to depopulate states which fail a particular clause, transferring population to other states which differ only by the variables contained in the clause. In this way, the flow of population mimics a breadth-first search for a state which satisfies the problem of interest. Ultimate transfer of population to the solution states occurs only indirectly, and may involve transfers to many intermediate states by means of many different pathways. The rates of depopulation due to failing individual clauses are user-controlled parameters with no a priori maximum value.

Each of these distinctions arises due to the additional problem specific information provided by 3SAT relative to a pure search of an unordered database, and collectively they account for the difference in convergence times. As shown in Eq. 52 and the accompanying discussion, the minimum fraction of population lost due to failure of an individual clause defines an important timescale for the decay of nonsolution population distributions. The condition that an eigendistribution decay more slowly than this uniquely defines a slowly decaying quasiequilibrium eigendistribution. In "back and forth iteration", varying the fractions of population lost due to failure of individual clauses projects the slowly decaying quasiequilibrium distribution onto quickly decaying eigendistributions, thereby increasing the rate at which population is transferred to the set of solution states.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A quantum computer system, which includes: a program loaded on said quantum computer system, wherein the program includes:
1) a defining function configured for defining decimation gates each including a corresponding decimation angle, a first density matrix and a second density matrix; 2) an altering function configured for altering one or more of the following control parameters: the identities of the decimation gates; the decimation angles corresponding to particular decimation gates; the order of application for the decimation gates; the number of times that particular decimation gates are applied between repetitions; and 3) an algorithm configured for altering the probability distribution for said quantum computer whereby the likelihood of obtaining a valid solution increases exponentially concentrating probability in solution states; said program configured for applying the altered physical operation to the quantum system; said program further defining a quantum computer mapping function mapping a first density matrix to a second density matrix; and said mapping function having no well-defined inverse mapping the final state of the system to the initial state.

2. A method for altering the probability distribution for states in a quantum system, which concentrates probability in a state or set of states which satisfies a logical formula; said method including the steps of:
defining decimation gates each including a corresponding decimation angle, a first density matrix and a second density matrix;
altering one or more of the following control parameters: the identities of the decimation gates; the decimation angles corresponding to particular decimation gates; the order of application for the decimation gates; the number of times that particular decimation gates are applied between repetitions; and
altering the probability distribution for said quantum computer whereby the likelihood of obtaining a valid solution increases exponentially concentrating probability in solution states.

3. A quantum computer system, which includes: a program loaded on said quantum computer system, wherein the program includes:
1) a defining function configured for defining decimation gates each including a corresponding decimation angle, a first density matrix and a second density matrix; 2) an altering function configured for altering one or more of the following control parameters: the identities of the decimation gates; the decimation angles corresponding to particular decimation gates; the order of application for the decimation gates; the number of times that particular decimation gates are applied between repetitions; and 3) an algorithm configured for altering the probability distribution for said quantum computer whereby the likelihood of obtaining a valid solution increases exponentially concentrating probability in solution states; and said program configured for applying the altered physical operation to the quantum system.

4. The quantum computer system according to claim 3, which includes:
said program further defining a quantum computer mapping function mapping a first density matrix to a second density matrix; and
said mapping function having no well-defined inverse mapping the final state of the system to the initial state.

\* \* \* \* \*